Oct. 7, 1952  N. E. DORRINGTON ET AL  2,613,053
BAG FILLING MACHINE
Filed Aug. 23, 1945  22 Sheets-Sheet 7

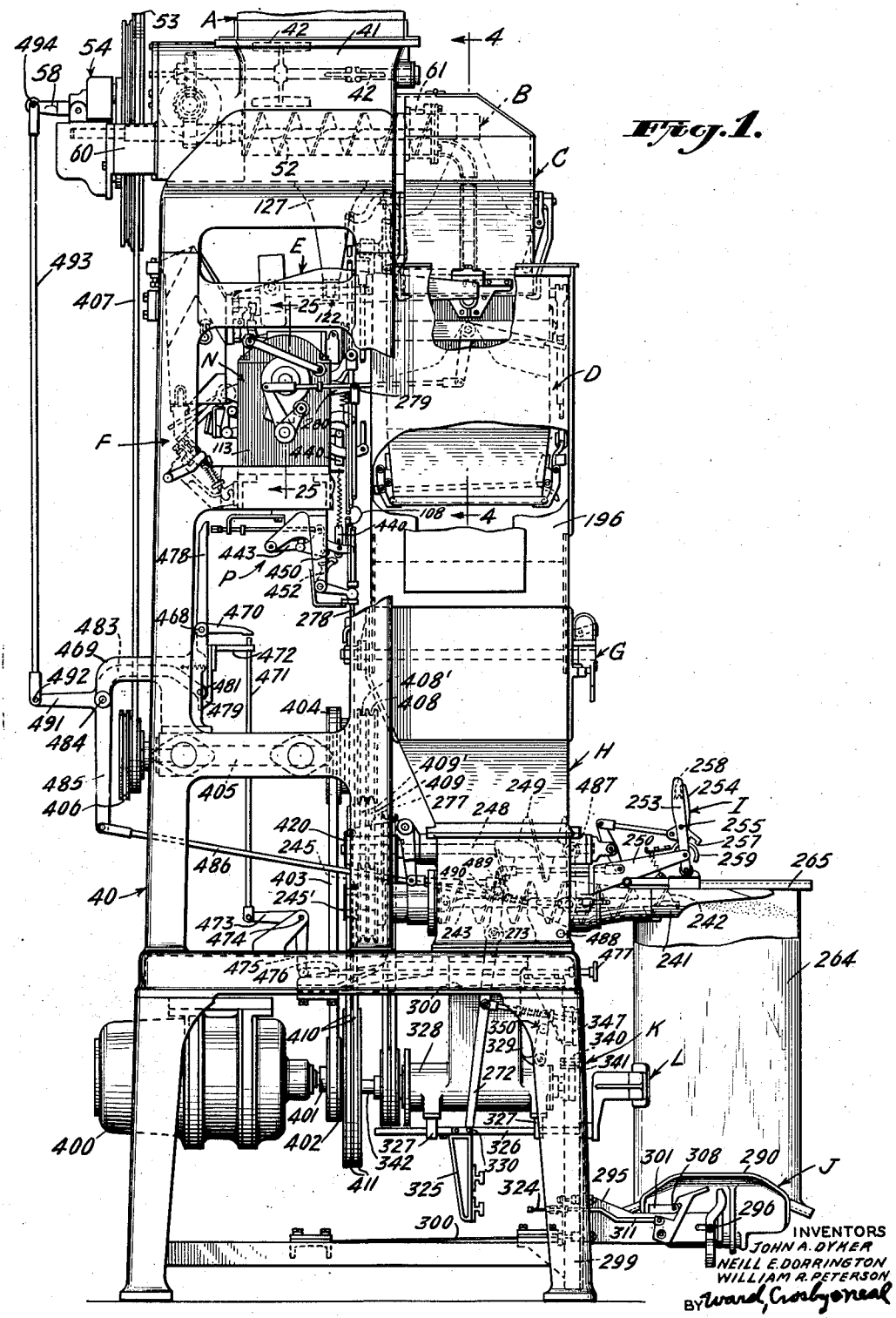

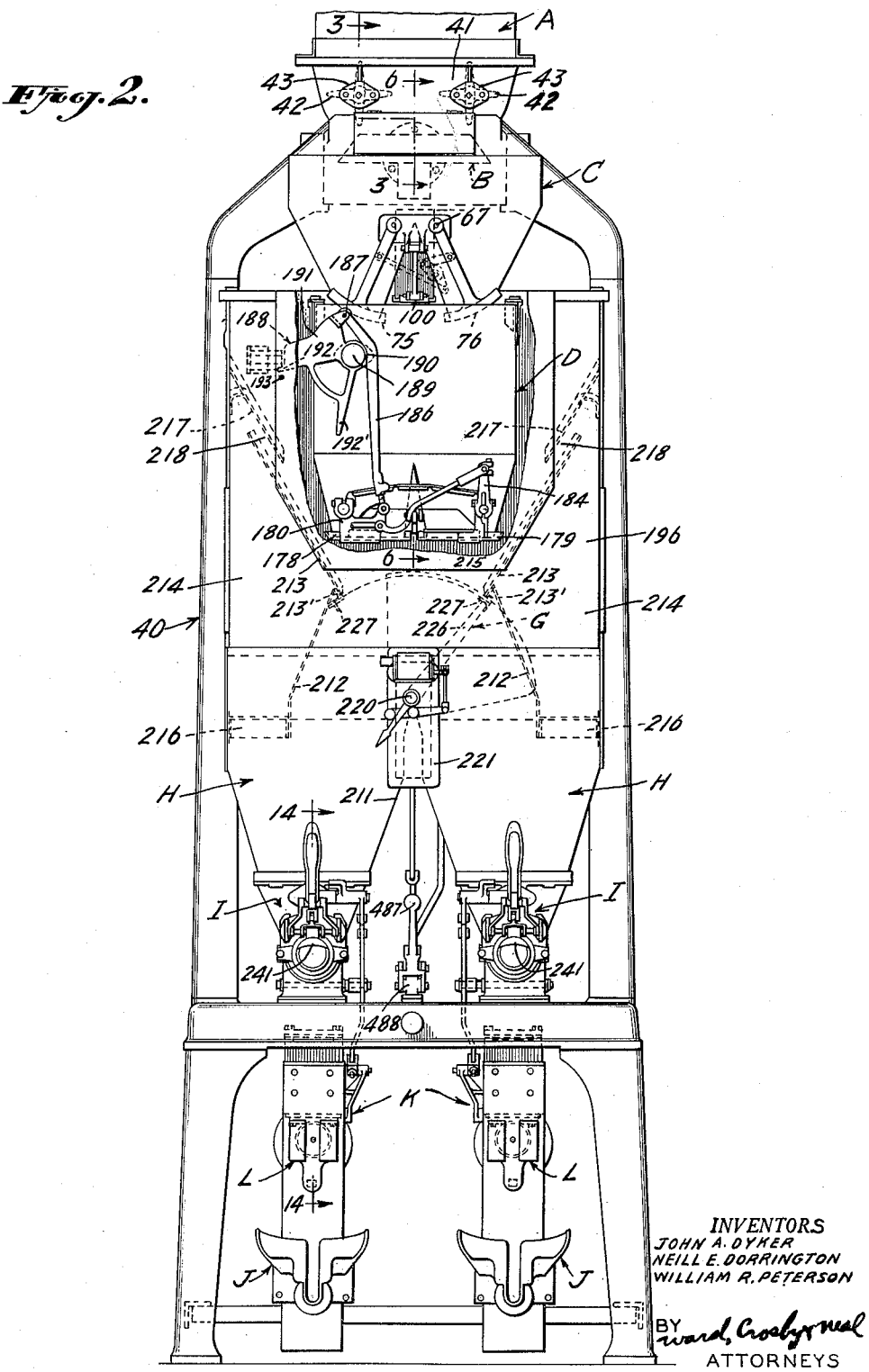

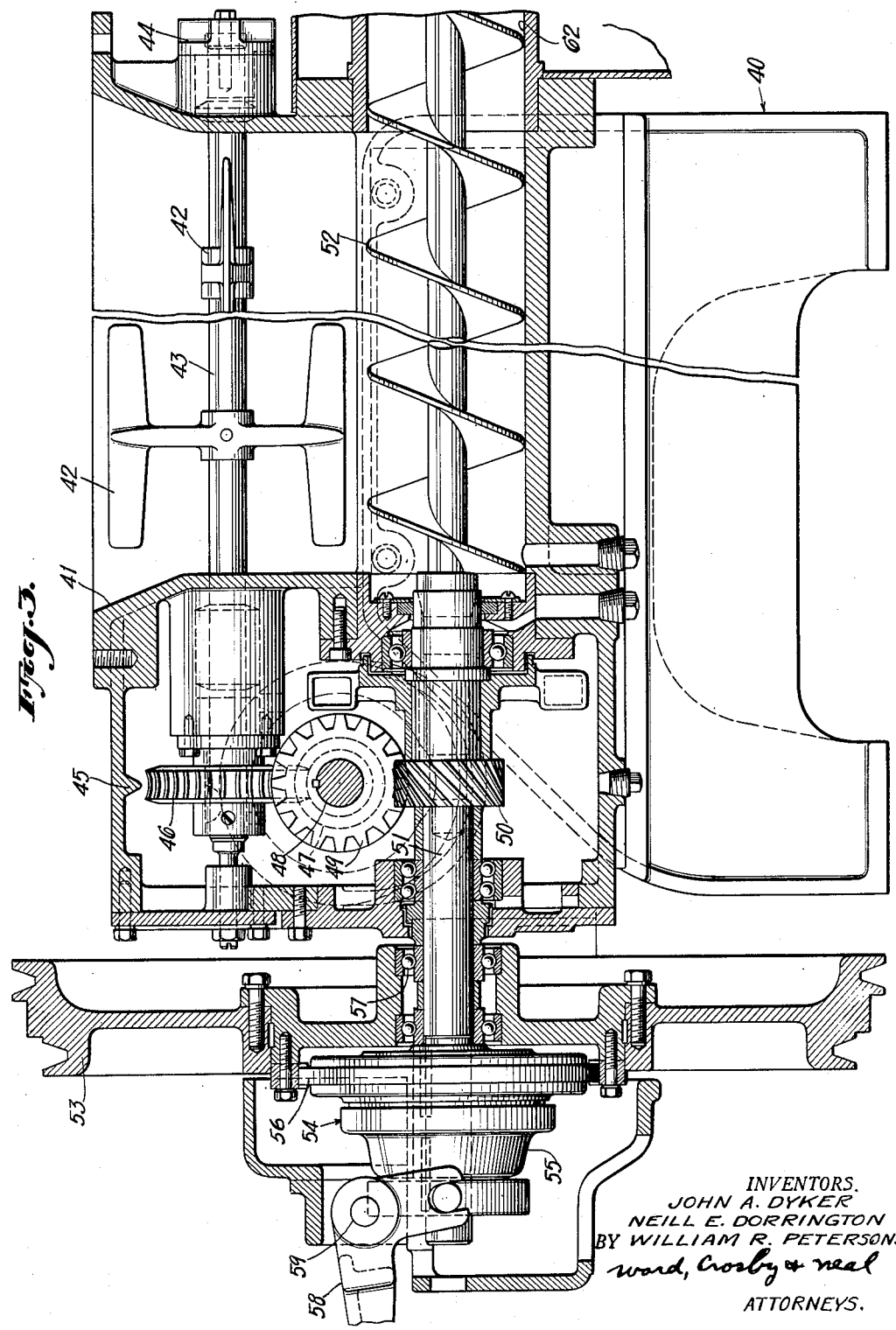

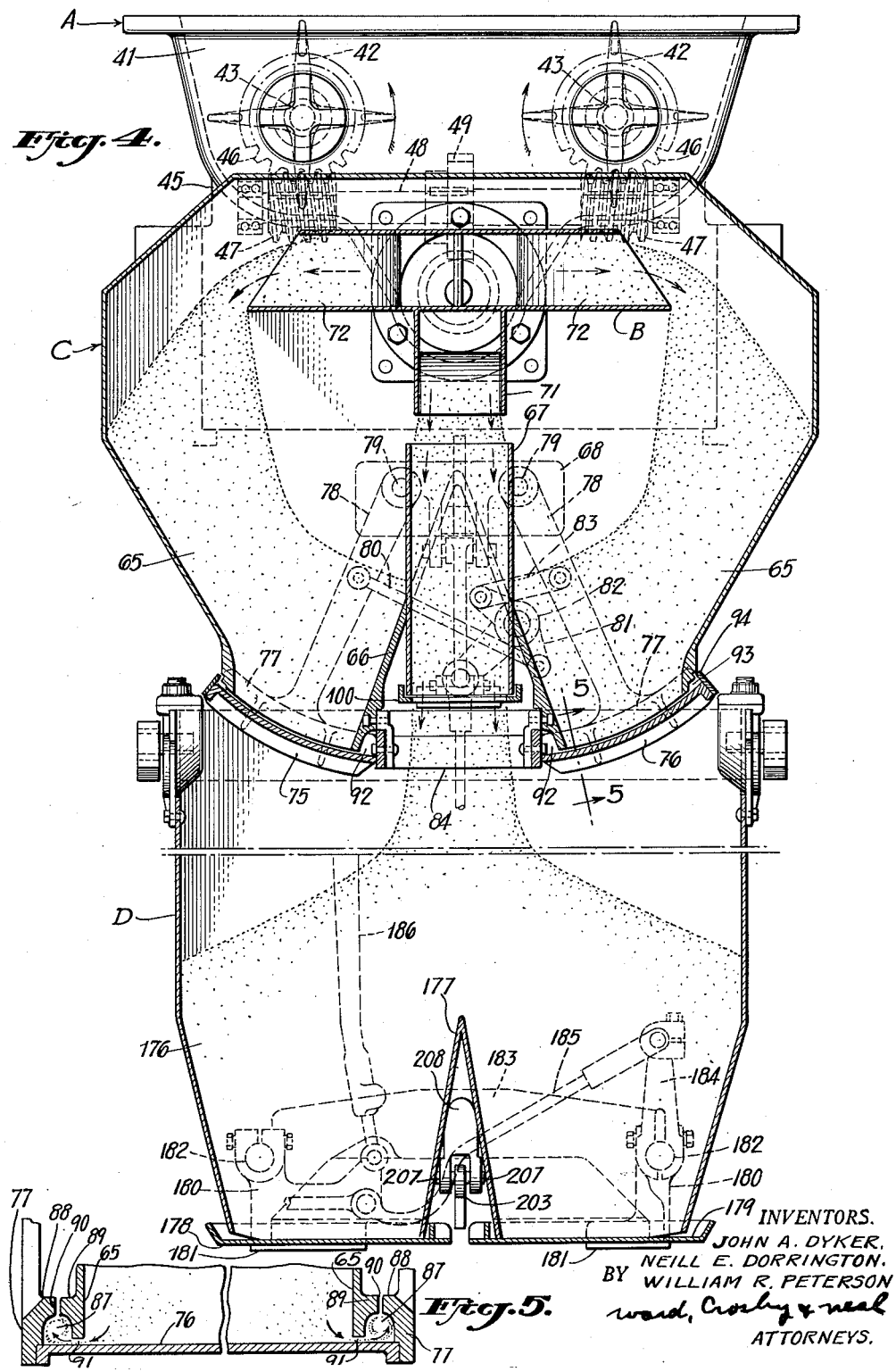

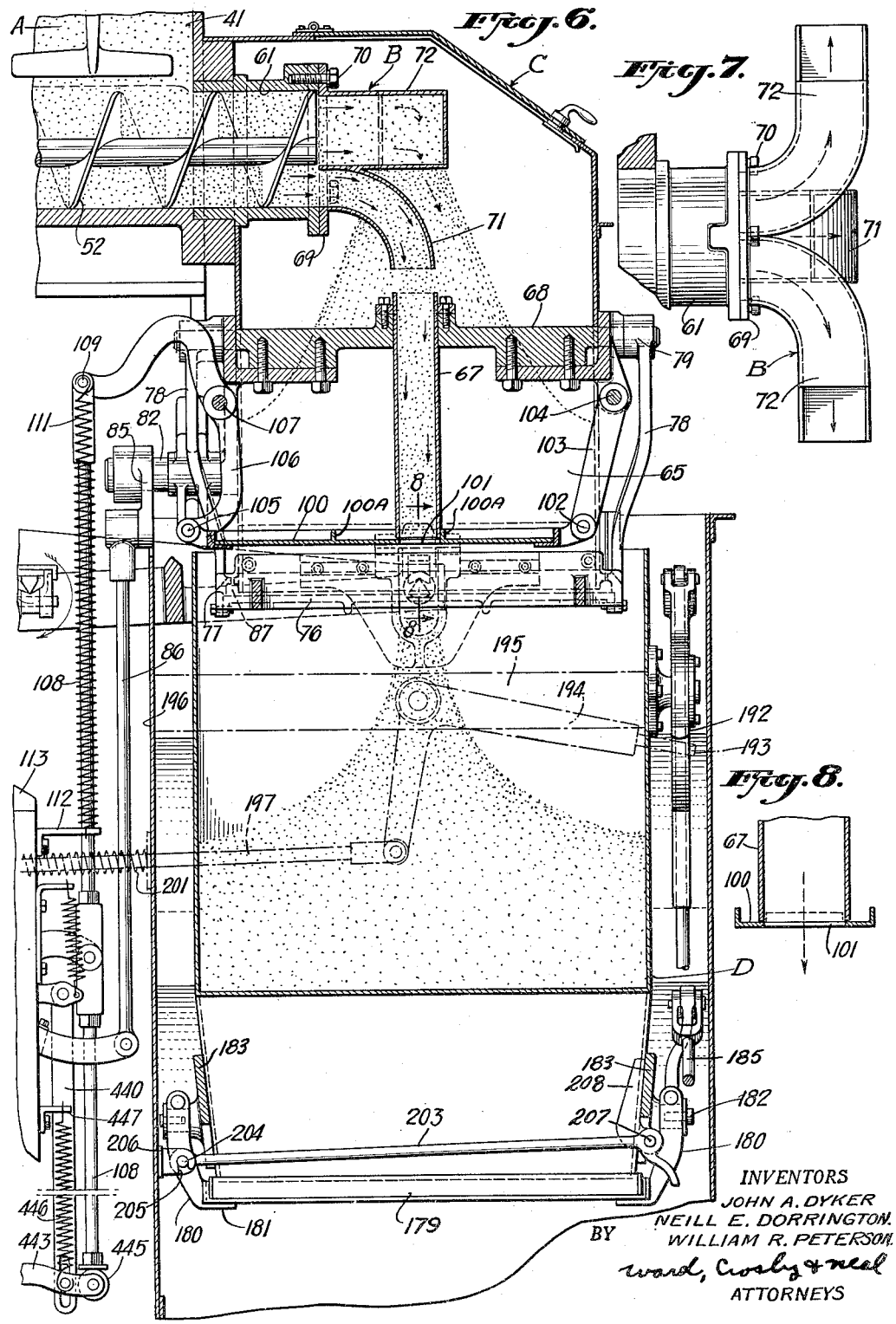

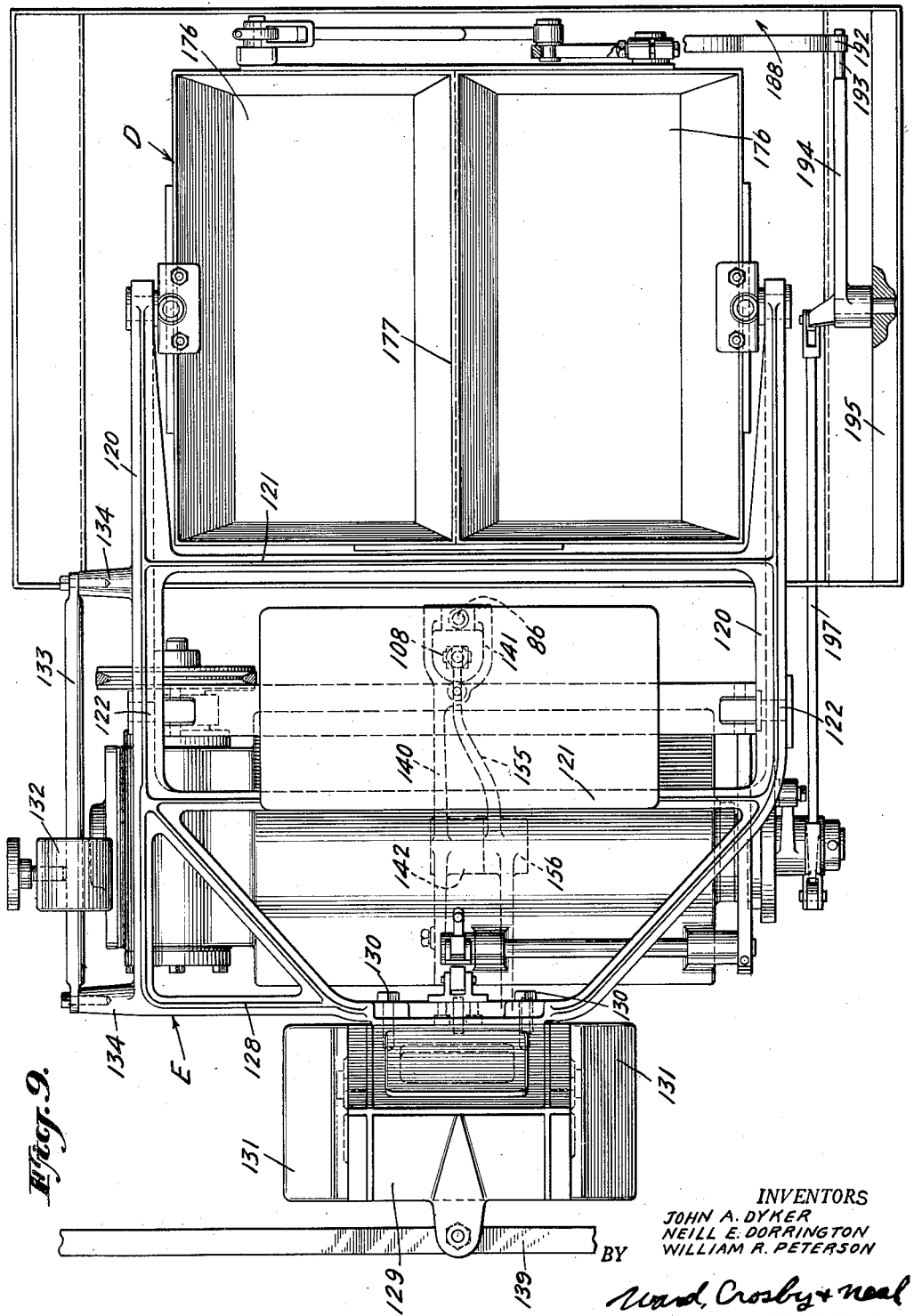

INVENTORS.
JOHN A. DYKER,
BY NEILL E. DORRINGTON,
WILLIAM R. PETERSON.
Ward, Crosby & Neal
ATTORNEYS.

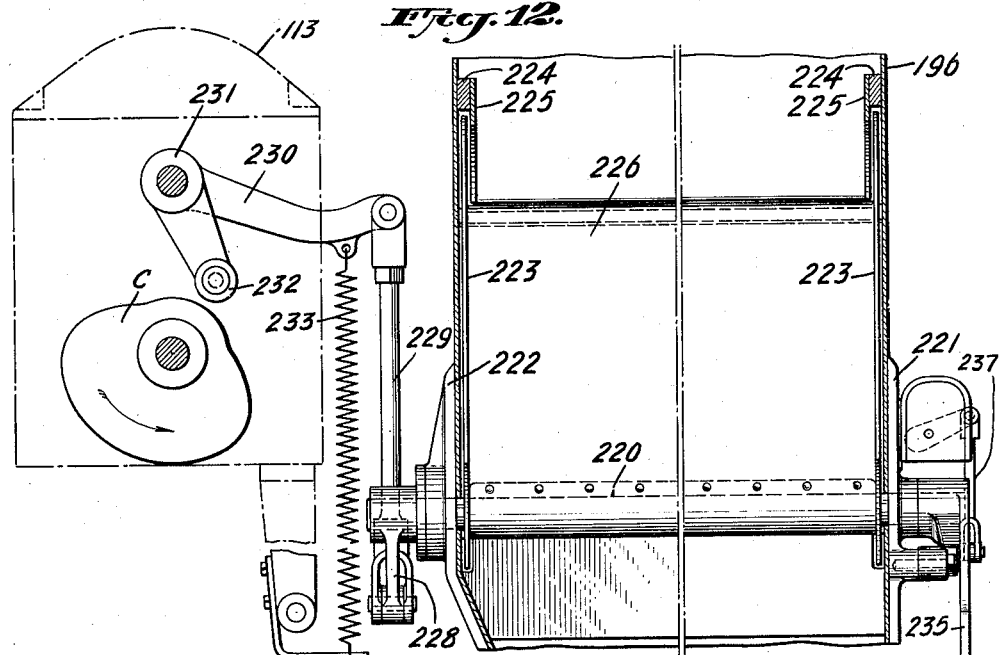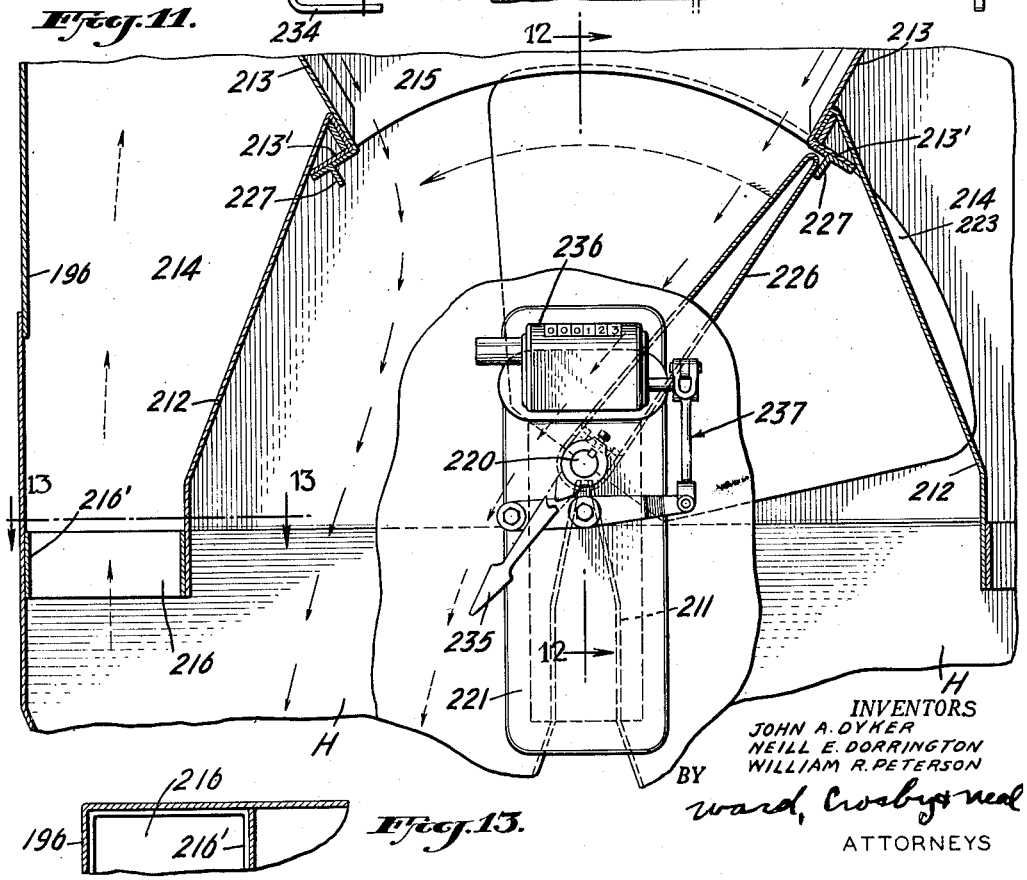

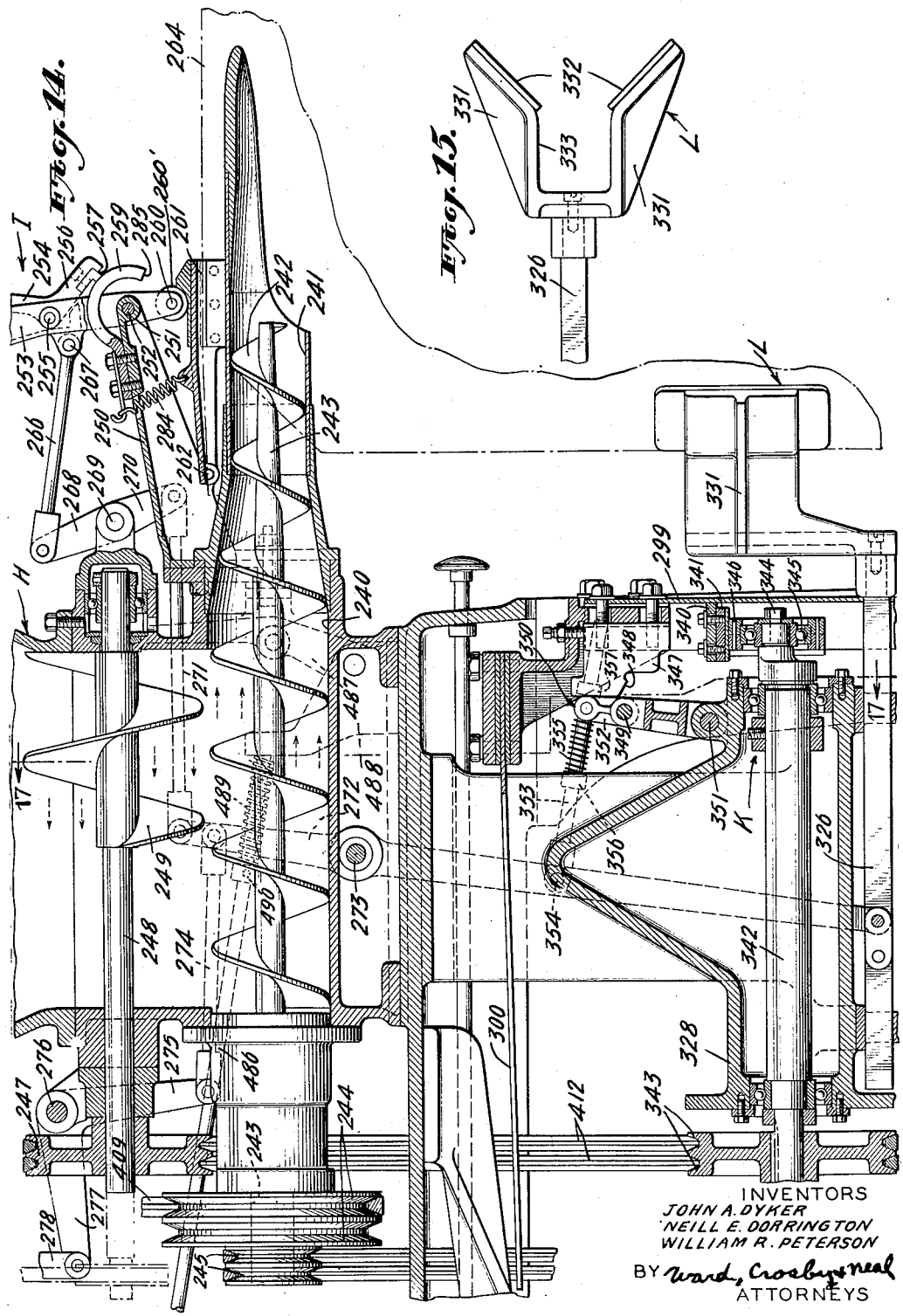

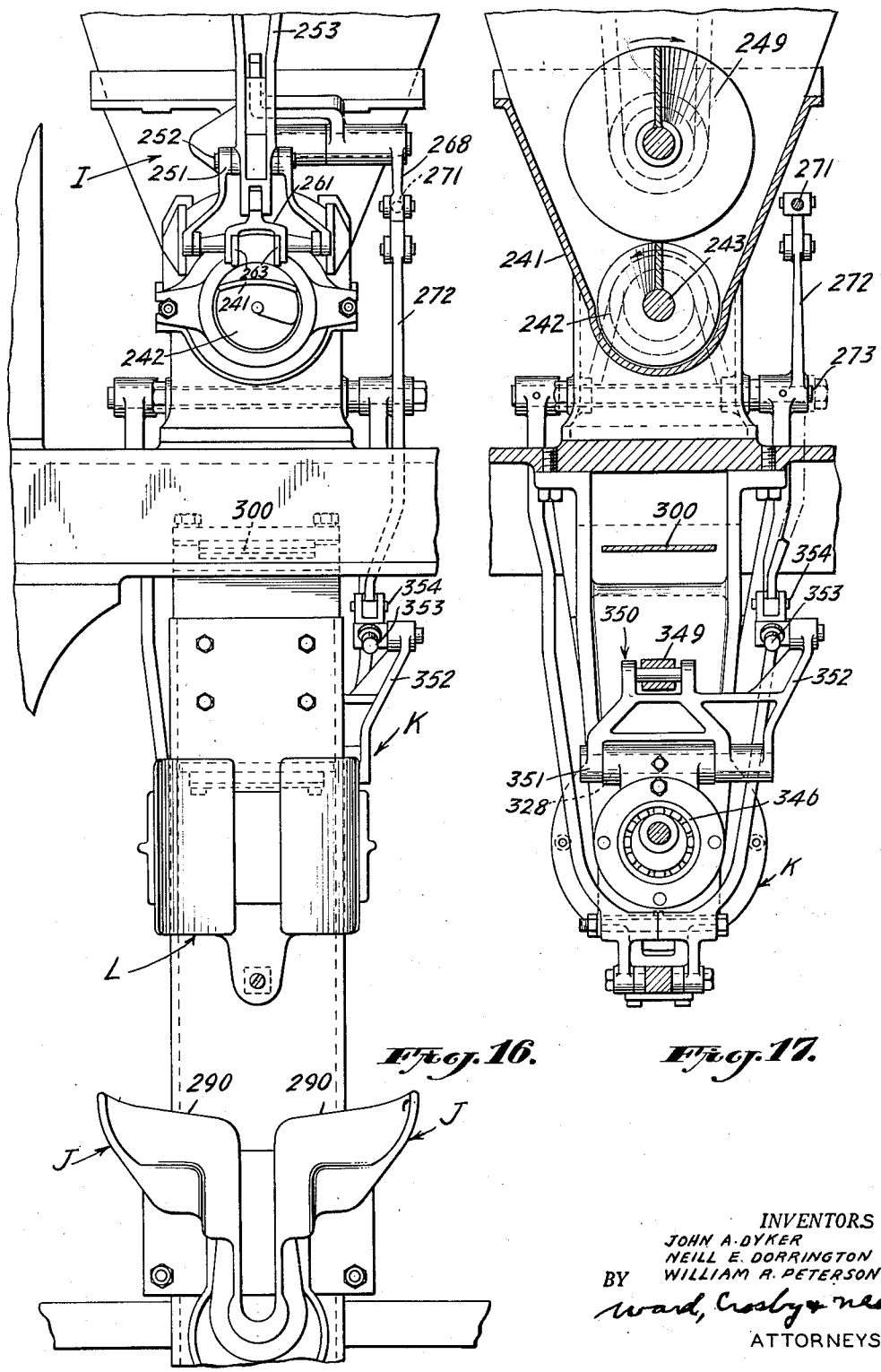

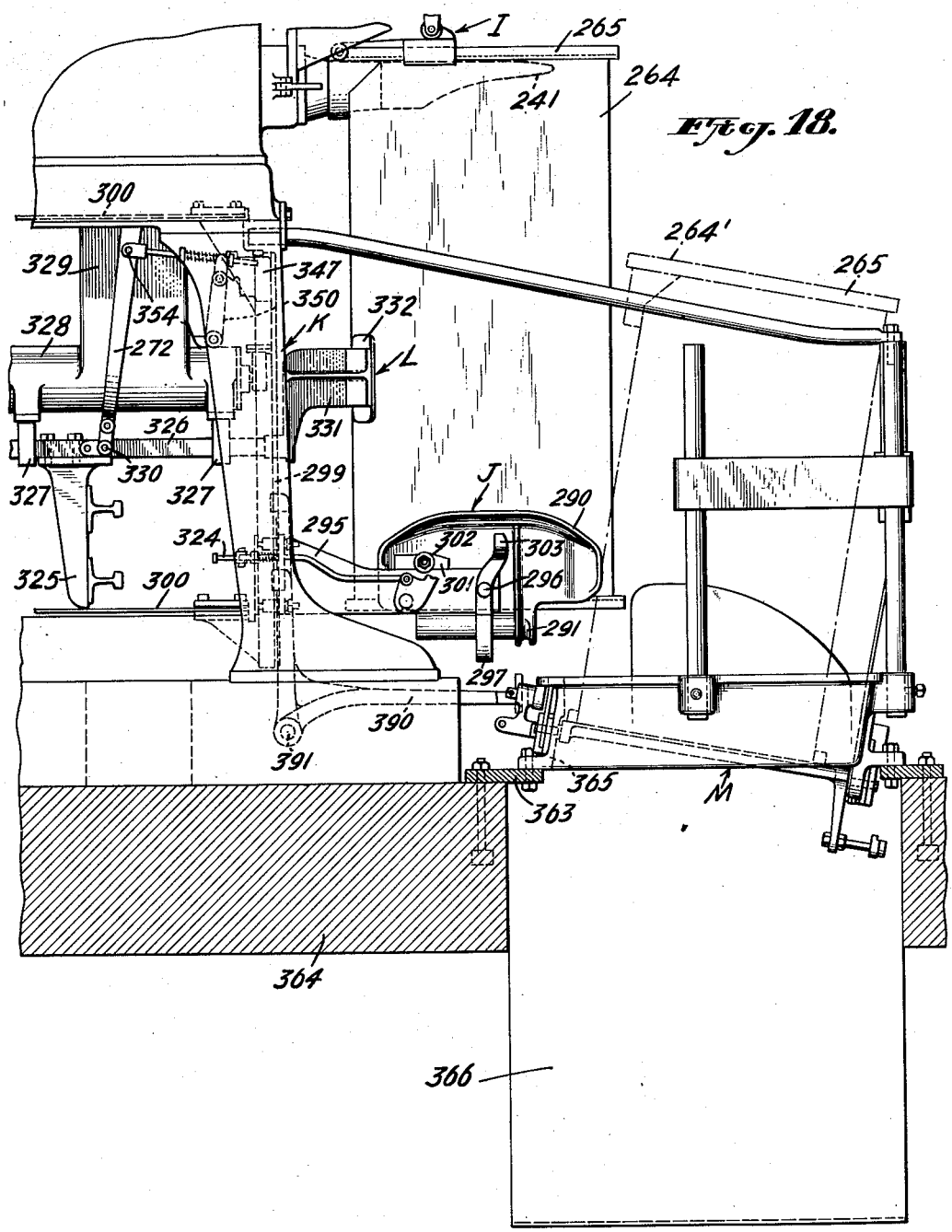

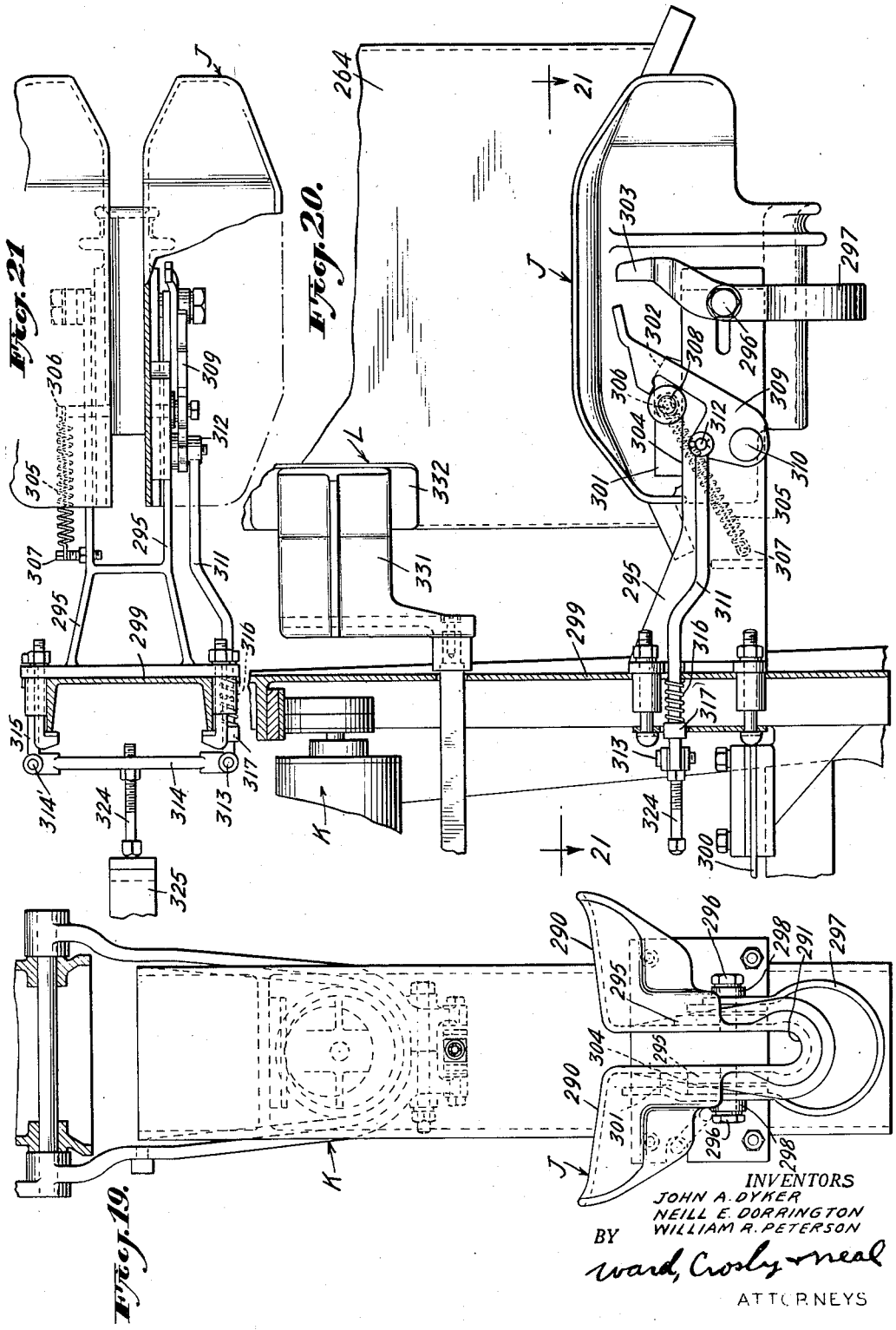

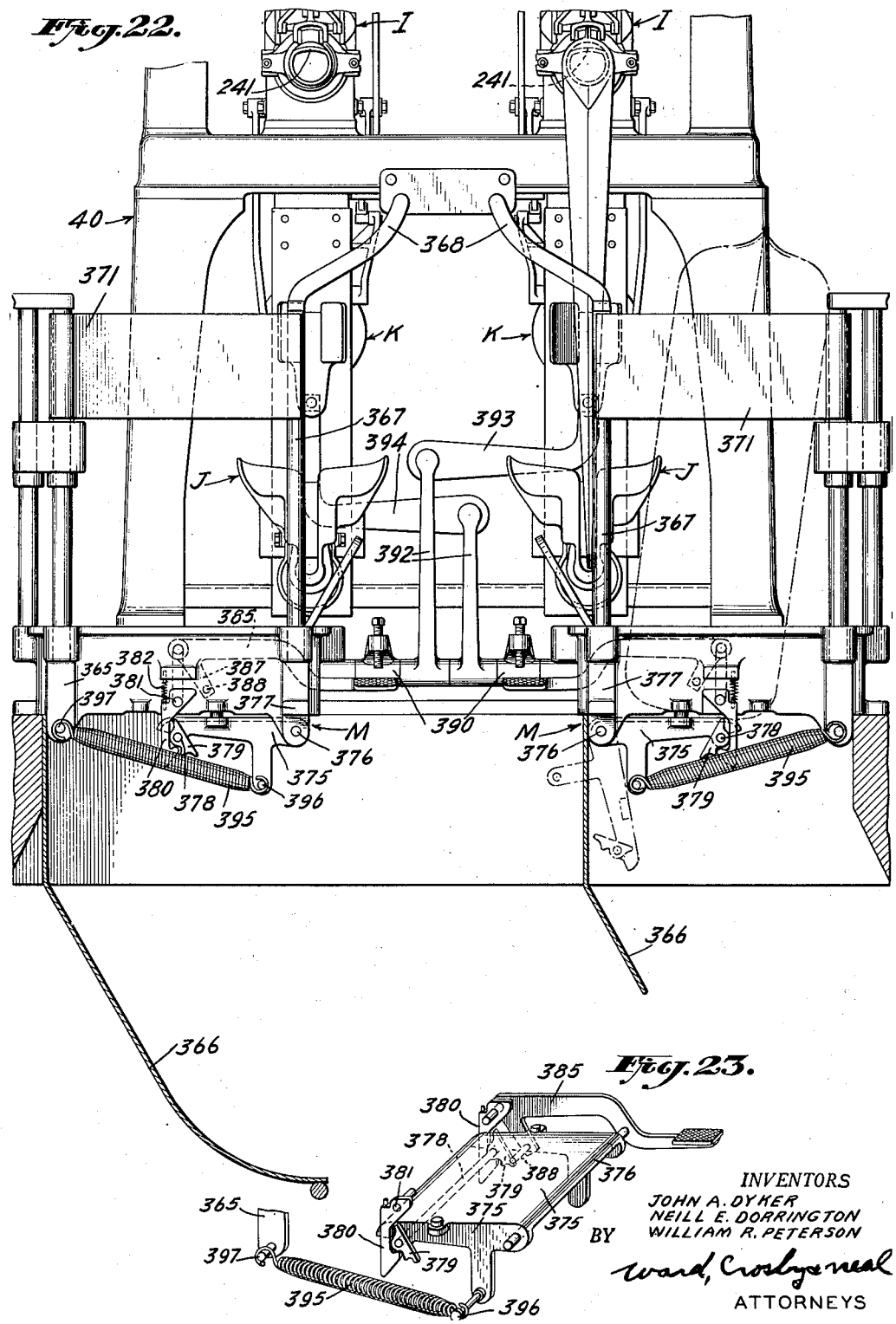

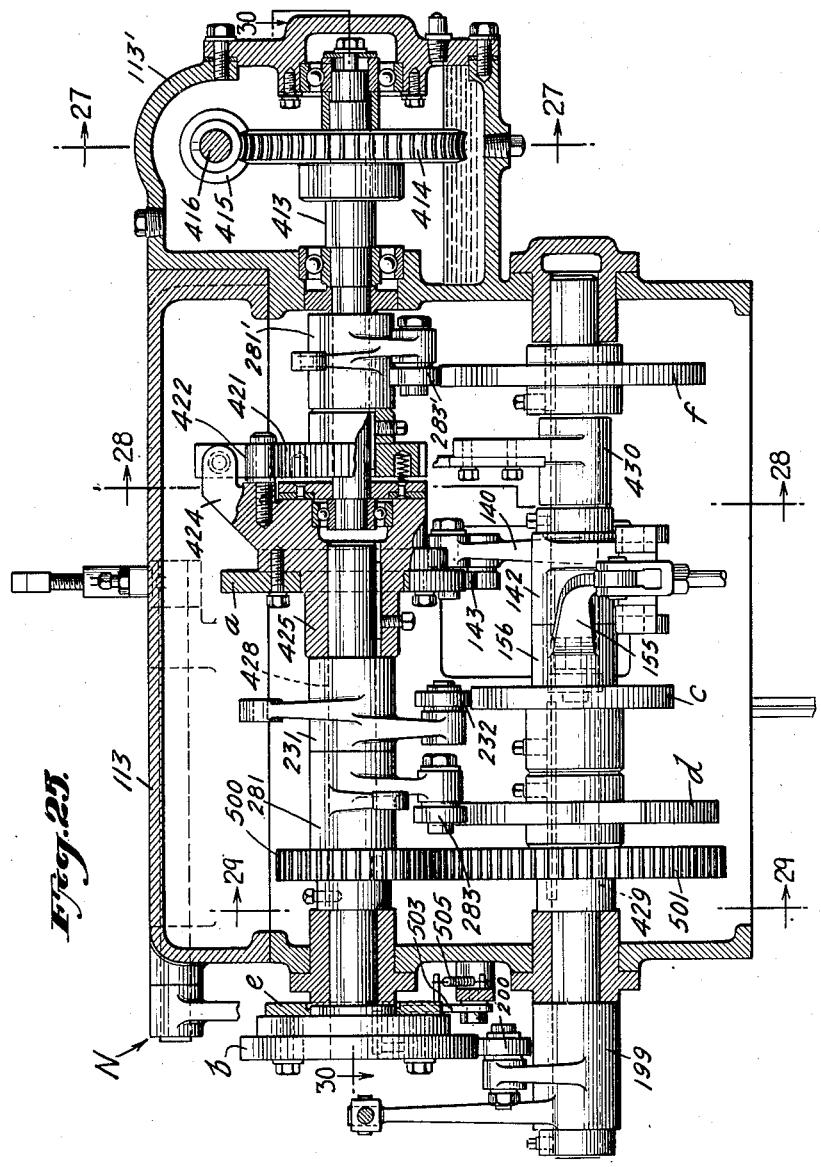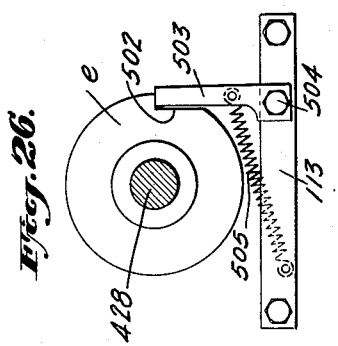

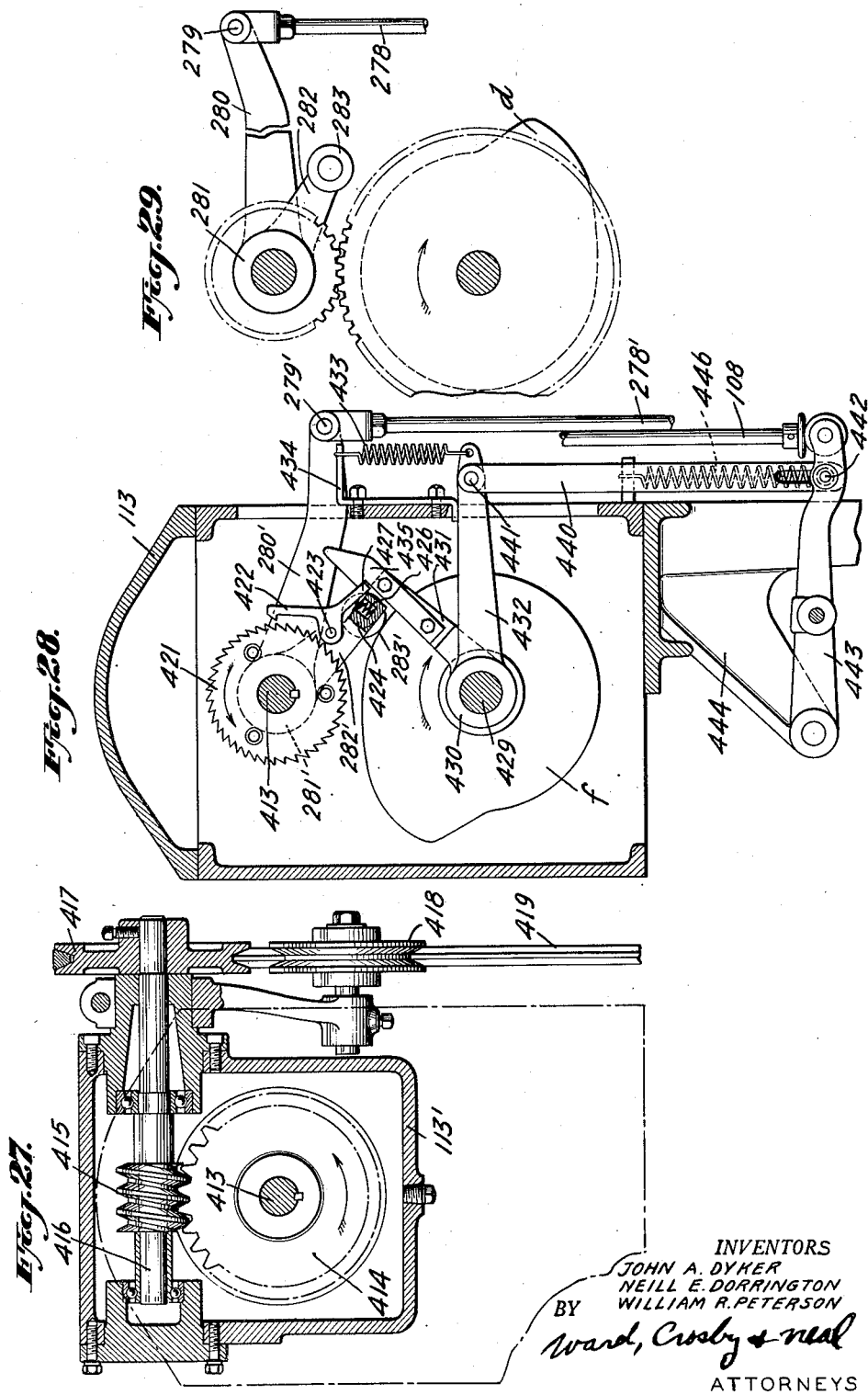

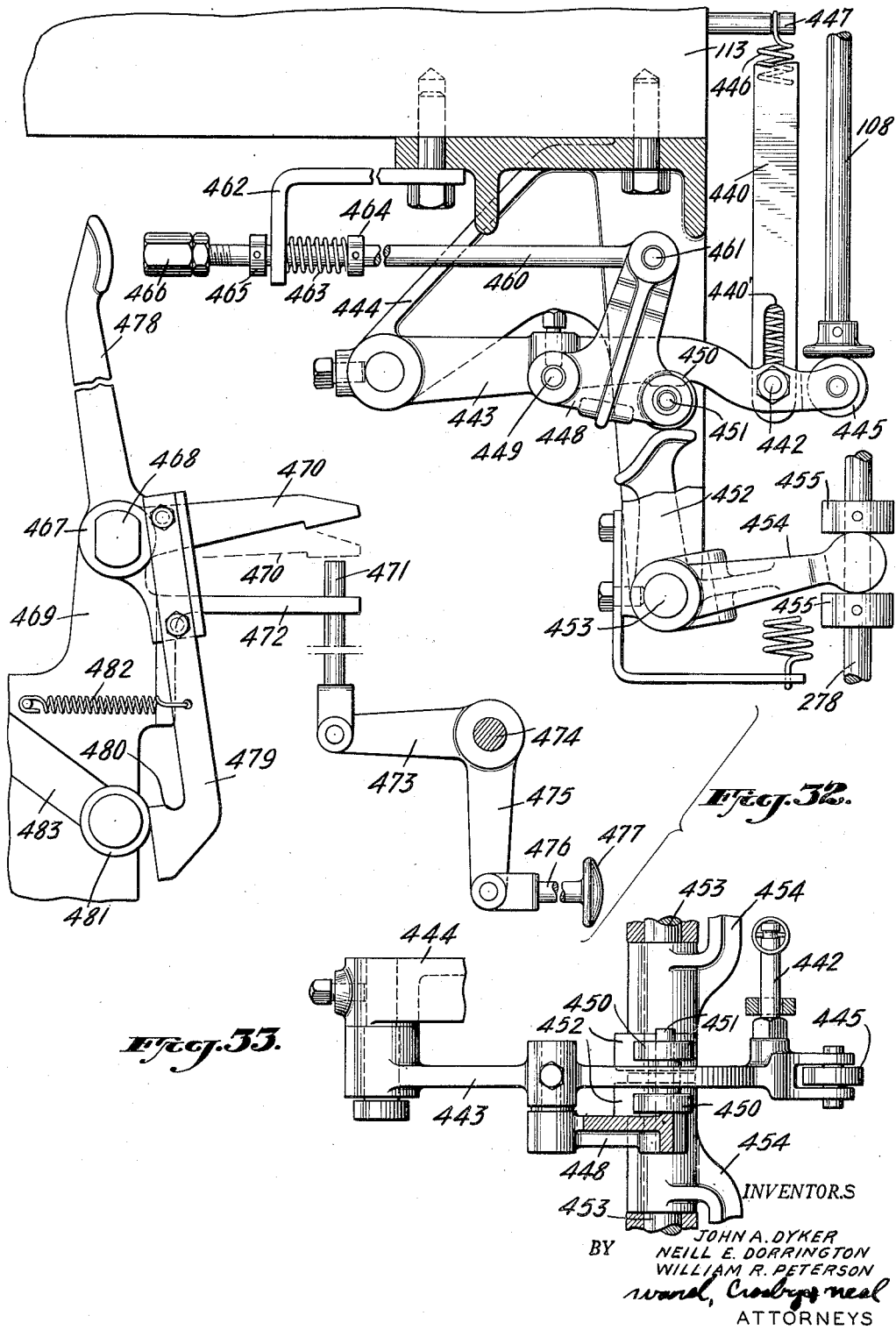

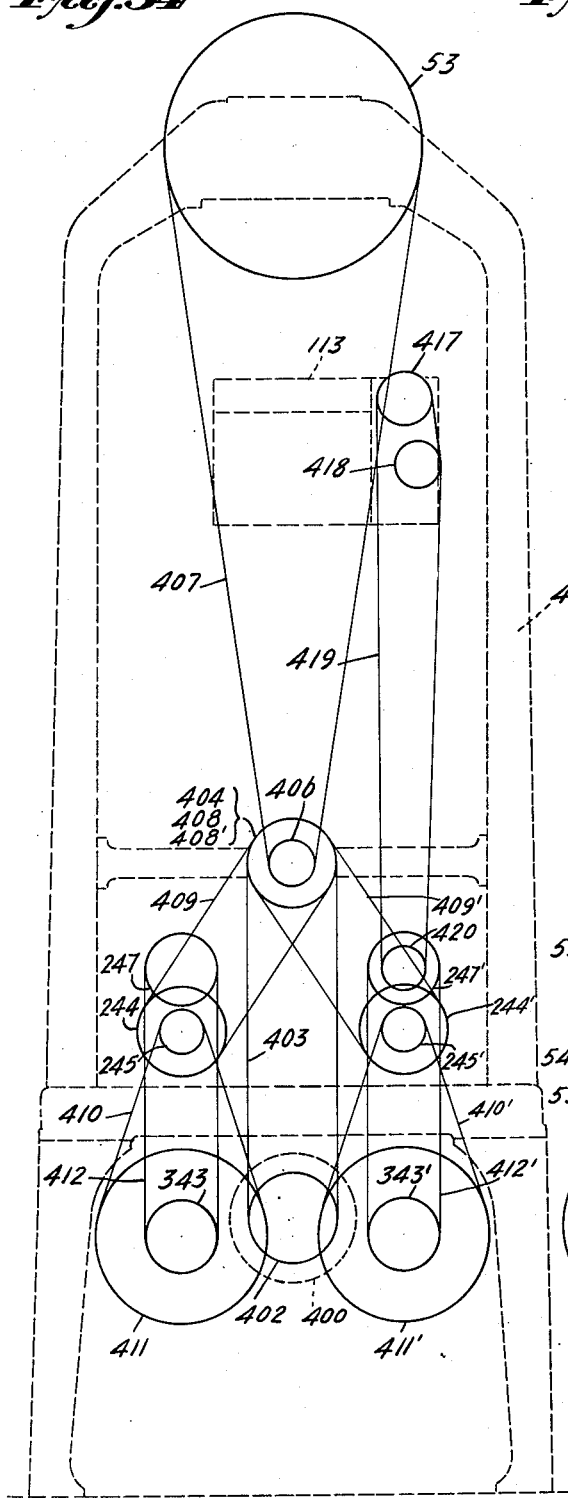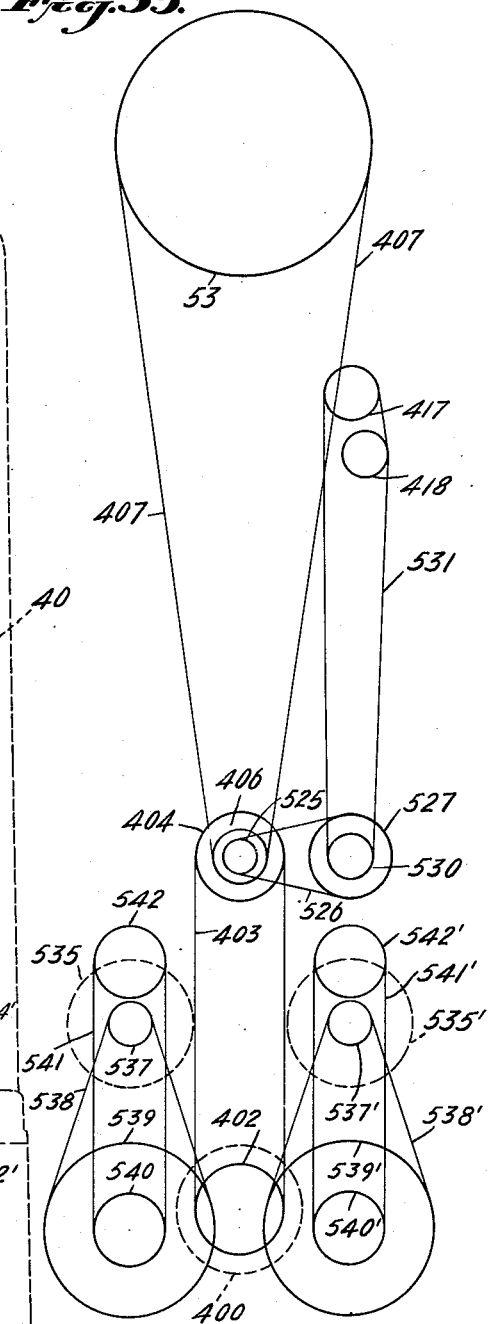

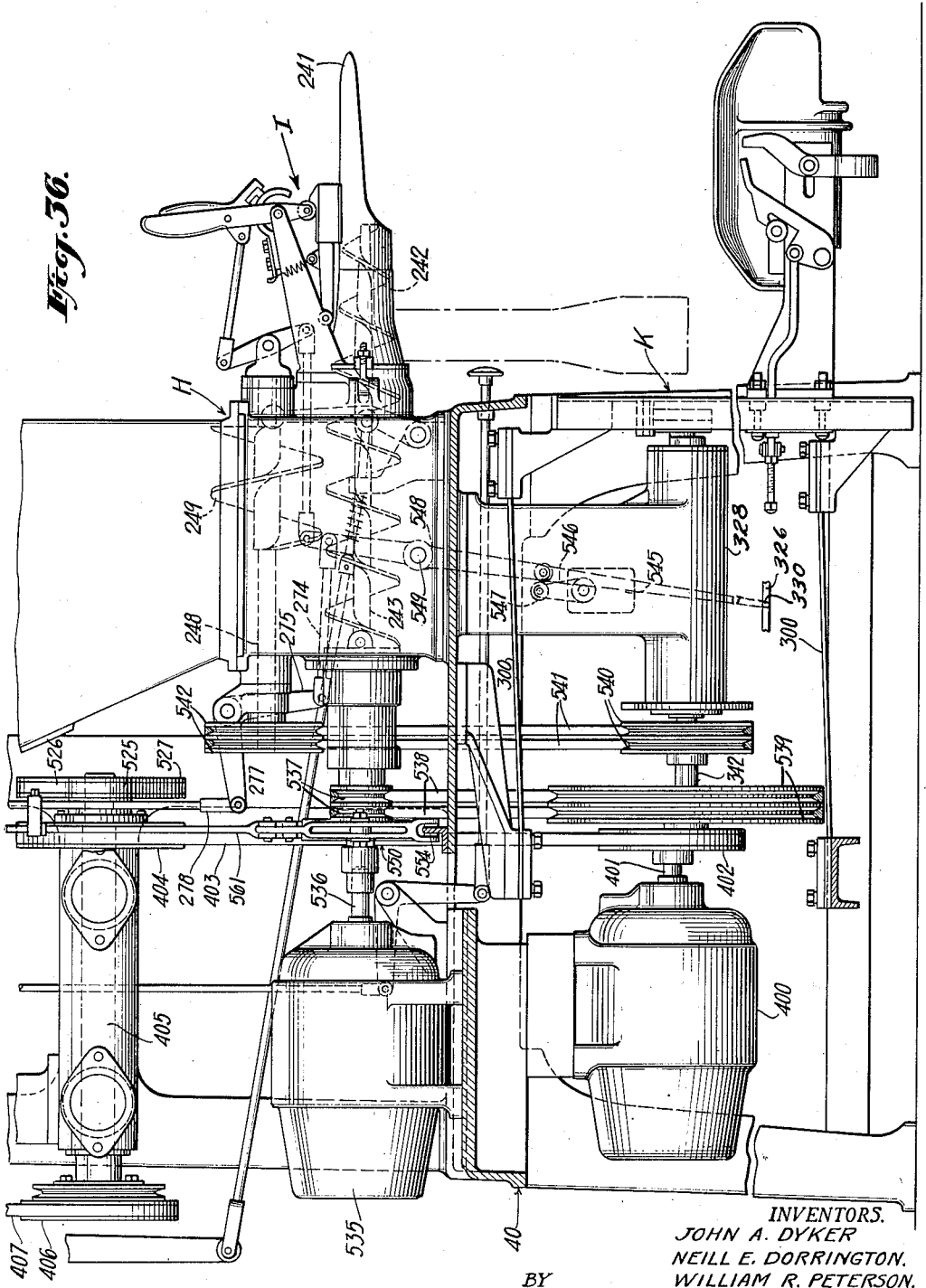

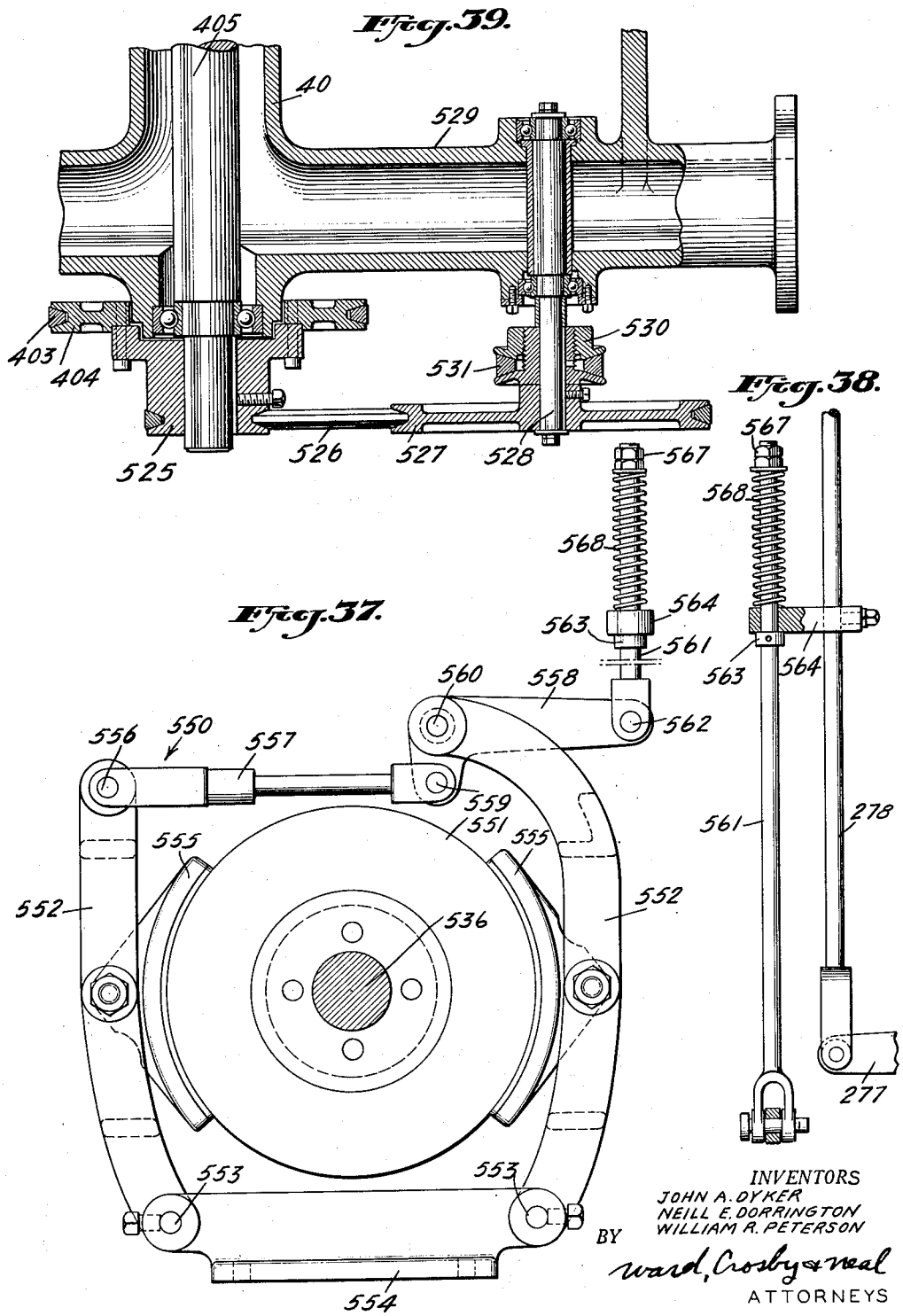

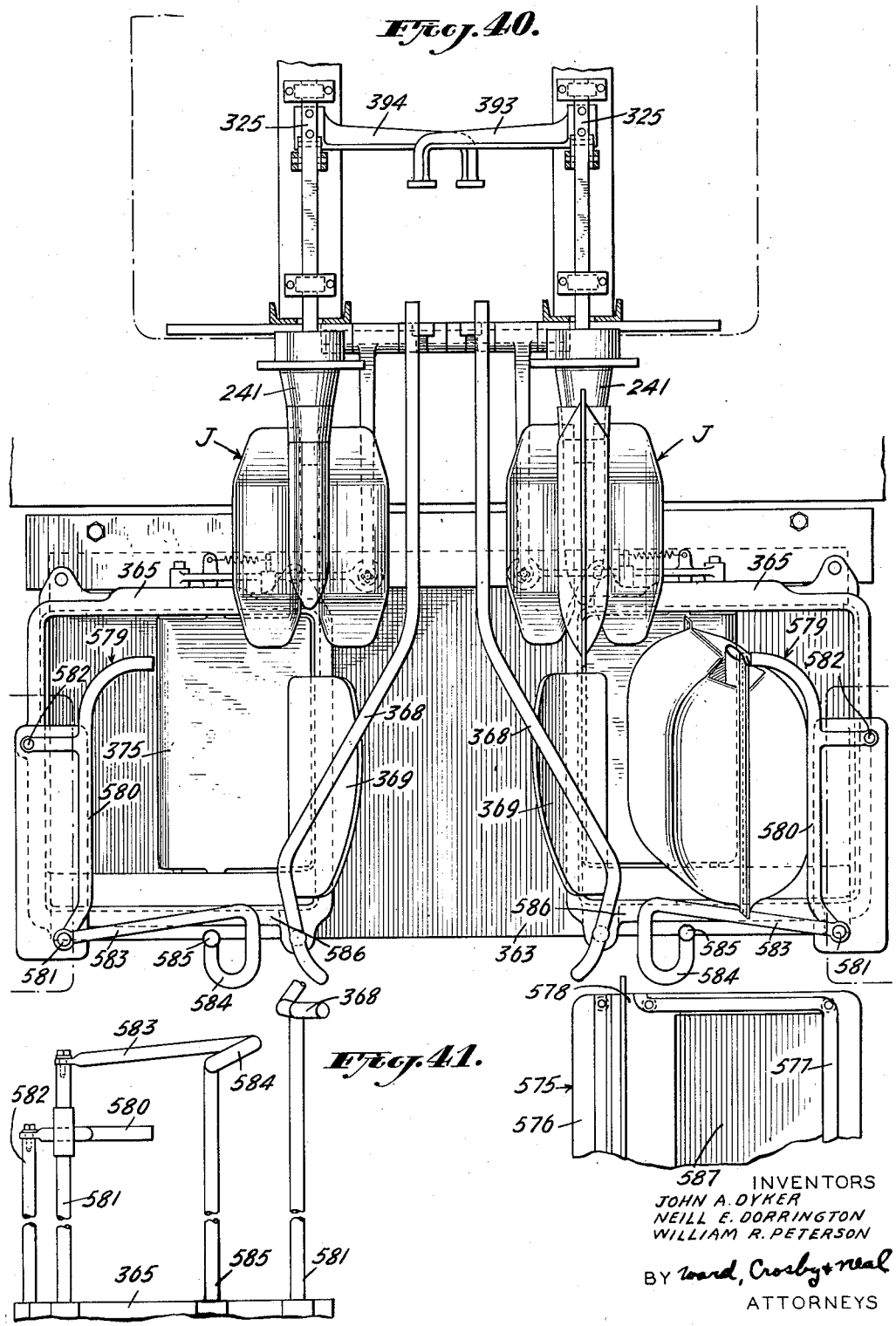

Patented Oct. 7, 1952

2,613,053

UNITED STATES PATENT OFFICE 2,613,053

BAG FILLING MACHINE

Neill E. Dorrington, John A. Dyker, and William R. Peterson, Oswego, N. Y., assignors to St. Regis Paper Company, New York, N. Y., a corporation of New York Application August 23, 1945, Serial No. 612,248

13 Claims. (Cl. 249—60)

Our invention relates to apparatus for filling bags with material and, more particularly, to apparatus for automatically weighing charges of material and for feeding each weighed charge of material into a bag.

With the apparatus of our invention, the hand operations involved in filling the bags and handling the filled bags are reduced to a minimum. In a preferred embodiment of the invention, an empty bag is manually clamped to a filling spout, the bottom of the bag extending into a suitable bag chair. A weighed charge of material is then automatically fed into the bag, an oscillatory or jigging movement being imparted to the bag chair as the material flows into the bag to cause proper settling of the material. After the bag has been filled, the clamp is automatically released and the bag is automatically moved longitudinally off the bag chair and away from the machine until the bag valve is substantially disengaged from the filling spout. The bag chair then tilts, allowing the bag to slide off onto a novel trap door mechanism, the bag remaining on the trap door in a convenient position for the operator to tuck in the sleeve or otherwise effect closure of the bag. After the bag has been closed, the trap door is automatically released to discharge the bag. A filling spout together with the associated bag-discharge mechanism is preferably located at each side of the machine and the entire bag-filling operation may be performed by a single operator. The reduction of hand operations in the manner described results in obtaining the unusually high-speed operation of our novel apparatus with which a packing rate of six 100 pound bags per minute may be easily attained.

Other important features of our novel apparatus include a safety device which prevents discharge of material through the filling spouts when bags are not properly secured thereto. When the safety device operates, the supply of material to the machine is cut off until a clutch lever is manually engaged to again permit the normal functioning of the apparatus. Important advantages are also inherent in the novel construction and operation of various other parts of the machine and these advantages will be pointed out in the detailed description given below taken in connection with the accompanying drawings which illustrate, by way of example, preferred forms of apparatus for carrying out the invention. The invention resides in such novel features, arrangements and combinations of parts as may be shown and described in connection with the apparatus herein disclosed.

In the drawings,

Fig. 1 is a side elevational view of the machine with the trap door mechanism omitted and with portions of the housing broken away to show the interior of the machine;

Fig. 2 is a front elevational view of the machine with the trap door mechanism omitted and with portions of the housing broken away to show the interior of the machine;

Fig. 3 is a sectional view of the feeding mechanism taken substantially along the line 3—3 of Fig. 2;

Fig. 4 is a sectional view of the feeding hopper and weighing receptacle taken substantially along the line 4—4 of Fig. 1 certain elements as at 184, 185 and 186 are in front of the sections shown but are indicated in dotted lines for purposes of clarity;

Fig. 5 is a fragmentary sectional view of one of the dump gates taken substantially along the line 5—5 of Fig. 4;

Fig. 6 is a sectional view of the filling hopper and weighing receptacle taken substantially along the line 6—6 of Fig. 2;

Fig. 7 is a top plan view, partly in section, of the three-way filling spout;

Fig. 8 is a detailed sectional view of the dribble gate and dribble gate receptacle taken substantially along the line 8—8 of Fig. 6;

Fig. 9 is a plan view of the scale and the weighing receptacle;

Fig. 11 is a front elevational view, partially broken away, of the interior parts of the deflector mechanism and dust-settling system;

Fig. 12 is a sectional view taken along the line 12—12 of Fig. 11 showing a portion of the control apparatus;

Fig. 13 is a detailed sectional view taken substantially along the line 13—13 of Fig. 11;

Fig. 14 is a view partly in section taken substantially along the line 14—14 of Fig. 2;

Fig. 15 is a detailed plan view of the bag pushing member;

Fig. 16 is a front elevational view of the lower left hand portion of the machine showing the bag discharge apparatus;

Fig. 17 is a partially sectional view taken substantially along the line 17—17 of Fig. 14;

Fig. 18 is a side elevational view of the lower portion of the machine showing the trap door mechanism with a portion of the locking lever for the bag chair broken away;

Fig. 19 is a front elevational view of the left hand bag discharge mechanism with portions of the apparatus broken away to show the details of the construction;

Fig. 20 is a side elevational view partly in section and with parts broken away of the left hand bag chair and bag pusher mechanism;

Fig. 21 is a sectional plan view of the left hand bag chair, partially broken away to show the detailed construction;

Fig. 22 is a front elevational view showing the lower portion of the machine and the trap door mechanism associated therewith;

Fig. 23 is a perspective view showing the means for locking and releasing the trap door;

Fig. 25 is a view partly in section of the control apparatus taken substantially along the line 25—25 of Fig. 1;

Fig. 26 is a detailed view showing the cam utilized to eliminate backlash;

Figure 30:
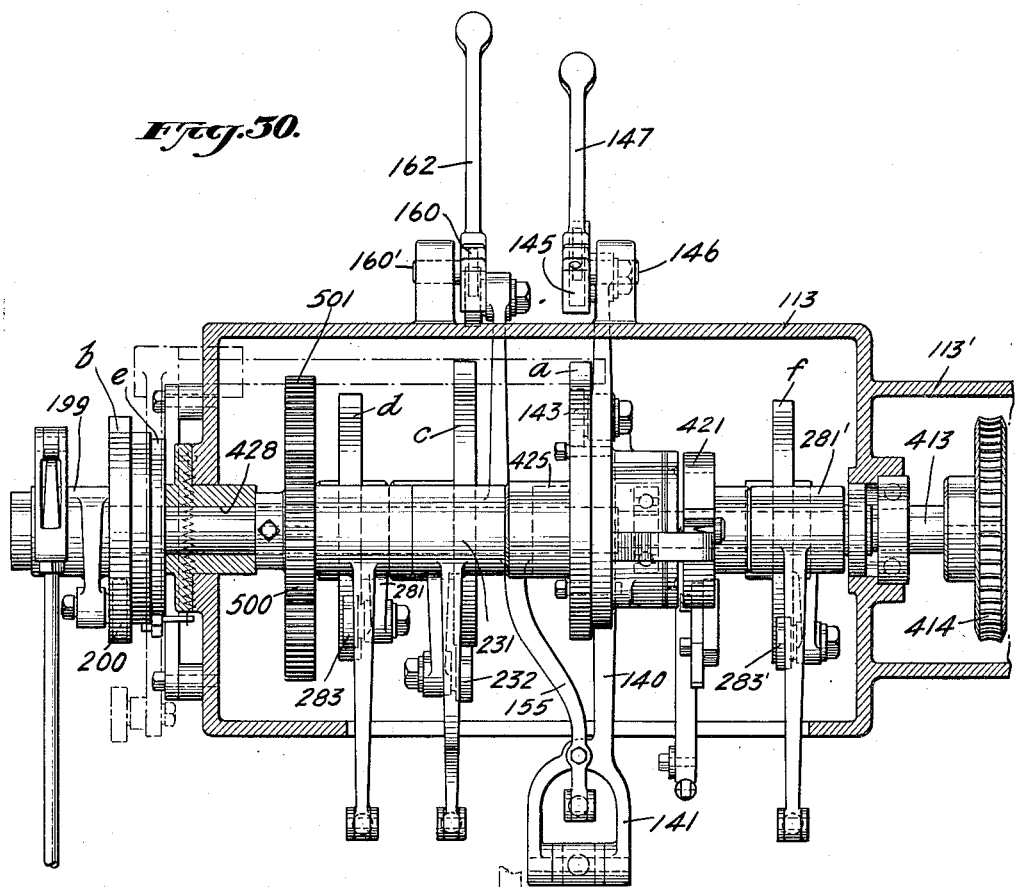
Figure 31:
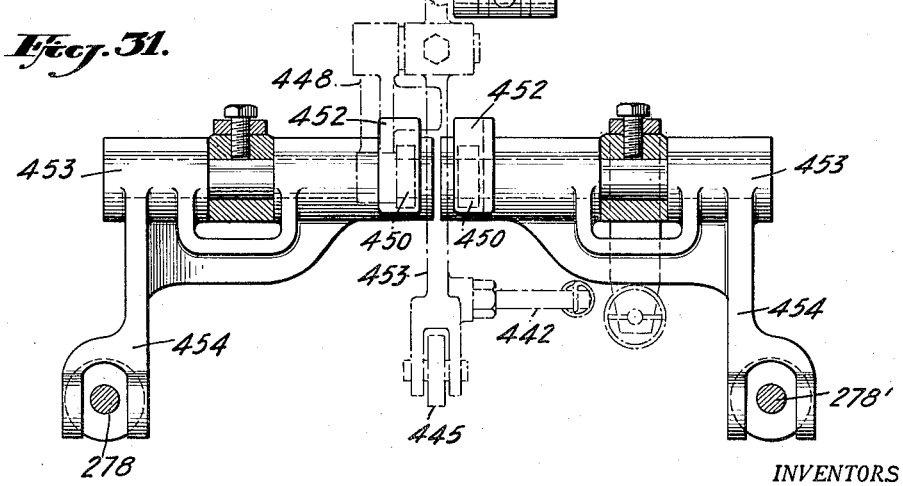

Figs. 27, 28 and 29 are, respectively, views partly in section taken along the lines 27—27, 28—28 and 29—29 of Fig. 25;

Fig. 30 is a sectional plan view taken substantially along the line 30—30 of Fig. 25;

Fig. 31 is a plan view, partially in section, of the safety device;

Fig. 32 is a side elevational view, partially in section, of the safety device shown in Fig. 31;

Fig. 33 is a detailed plan view partly in section showing a detailed feature of the safety device;

Fig. 34 is a diagrammatic view showing the arrangement of belts and pulleys for driving the apparatus;

Fig. 35 is a diagrammatic view showing the belt and pulley arrangement used in a modified form of the invention;

Fig. 36 is a side elevational view, partially in section, showing a modified form of the invention;

Fig. 37 is a front elevational view showing a brake used with the modified form of the invention shown in Fig. 36;

Fig. 38 is a detailed view illustrating the manner of operating the brake;

Fig. 39 is a detailed plan view, partially in section, showing a detailed feature of the modified driving arrangement;

Fig. 40 is a plan view illustrating a modified construction for the trap door mechanism; and Fig. 41 is a diagrammatic front elevational view showing the guides illustrated in Fig. 40.

The operation of the apparatus will first be described in a general manner after which the detailed description will follow. Referring to Figs. 1 and 2, a continuous stream of material is supplied in any suitable manner, to the feed-receiving apparatus A, which directs the material through a three-way discharge spout B of novel construction into a filling hopper C. A weighing receptacle D mounted on a scale E is adapted to receive material from the filling hopper C. During the initial stages of the weighing operation, a relatively large bulk stream and a relatively small dribble stream flow from the filling hopper C into the weighing receptacle D. When a predetermined weight—less than the final desired weight—is reached, the bulk stream is cut off by suitable tripping mechanism indicated generally at F. The dribble stream continues to flow into the weighing receptacle D until the final desired weight is reached whereupon the tripping mechanism F entirely cuts off the supply of material to the weighing receptacle D.

The material then passes through a deflector gate G which directs the weighed charges of material alternately into suitable filling hoppers indicated at H, H, Fig. 2. Each filling hopper has a filling spout secured thereto to which a bag may be secured by a clamp I, the weighed charge of material passing from the hopper H through the filling spout into the bag. As the bag is being filled, the bottom of the bag is positioned in a bag chair J to which an oscillatory or jigging movement is applied by settler apparatus indicated at K. The filled bag is then pushed along the bag chair J by a bag pusher L to thereby disengage the valve of the bag from the filling spout. As the valve of the bag is disengaged from the filling spout in the manner described, the bag chair J tilts, allowing the bag to slide off the chair onto a suitable trap door mechanism indicated generally at M, Fig. 18, the bag being supported by the trap door mechanism M while the operator tucks in the sleeve or otherwise effects closure of the bag. Thereupon, the trap door is released and the bag is discharged onto a suitable chute for further processing. The operation of the apparatus is timed and controlled by suitable control means indicated at N, Fig. 1. A safety device is provided at P to prevent delivery of a charge of material through a filling spout when a bag is not clamped thereto. In the event that the weighing of a charge of material is completed while a bag is not properly secured to the filling spout, the safety device P operates to disengage the clutch of the feeding mechanism A thus preventing delivery of further material to the machine until a lever is manually moved to re-engage the clutch on said feeding mechanism A. The apparatus and operation will now be described in detail with reference to the foregoing general description.

*The feed-receiving apparatus*

Referring particularly to Figs. 1 to 4, inclusive, the material fed to the bag-filling machine is delivered to the feed-receiving apparatus A which is mounted on a supporting frame 40. Feed-receiving apparatus A may comprise a hopper 41 which is adapted to receive a preferably continuous stream or an intermittent stream of the material which is to be packed. Although it will be apparent that the apparatus may be used for packing any type of granular material, the apparatus is preferably utilized for packing light and fluffy non-flowing material such, for example, as flour, sweet potato pulp, starch, diatomaceous earth and the like. It will be understood that the material may be supplied from any suitable source such, for example, as a storage bin or mill stream.

A pair of agitators 42, 42 are mounted on shafts 43 and 43, respectively, which are journaled in the hopper 41 as at 44, Fig. 3. Shafts 43, 43 may extend through the hopper 41 into a housing 45, each shaft 43 carrying a worm wheel 46, Fig. 4, meshing with a worm 47 on a shaft 48 journaled in the housing 45. A gear wheel 49 on shaft 48 meshes with a gear wheel 50, Fig. 3, mounted on a shaft 51 which is journaled in the housing 45. Shaft 51 is adapted to carry a feed screw 52 which is mounted at the bottom of the hopper 41 at a lower level than the agitators 42, 42. Shaft 51 is driven by a sheave 53 through a clutch 54 which comprises a clutch member 55 keyed to the shaft 51, said clutch 54 also comprising a clutch member 56 which is suitably secured to the sheave 53, clutch member 56 and sheave 53 being rotatable with respect to shaft 51 on ball bearings 57.

The clutch 54 is operated by a lever 58 which is mounted on a pin 59 carried by a member secured to the fixed clutch housing 60, Fig. 1, said lever 58 being operatively connected to the movable clutch member 55, Fig. 3. It will be apparent that, when lever 58 is raised, clutch member 55 is moved out of engagement with clutch member 56 and no power is applied to the shaft 51 from the sheave 53. When lever 58 is lowered, clutch member 55 engages clutch member 56 to thereby cause rotation, in the manner hereinafter described, of shaft 51 together with the feed screw 52 and agitators 42, 42. When the feed-receiving apparatus A is operated in the described manner, the agitators 42, 42 rotate in the direction of the arrows, Fig. 4, to thereby direct a stream of material from the hopper 41 into the feed screw 52 which compacts the material to some extent and delivers it to an outlet tube 61 in the lower part of the hopper 41. The agitators 42, 42 prevent material from accumulating at the sides of the hopper even when a large capacity hopper is utilized. When such a large capacity hopper is used, a larger volume of material may be maintained in the hopper with the result that a very steady stream of material is delivered through the outlet tube 61 by the feed screw 52 despite minor variations in the quantity of material fed to the machine. Furthermore, the hopper 41 and feed screw 52 may be of large enough capacity that sufficient material will be supplied by the feed-receiving apparatus A to the rest of the machine when operating at maximum or even at abnormally high speeds.

The discharge spout and feeding hopper

From the outlet tube 61, the material flows through a discharge spout B into a feeding hopper C, Figs. 4 and 6. The feeding hopper C may be divided into two bulk-stream receptacles 65, 65 separated by an inverted V-shaped member 66, Fig. 4, integral with the feeding hopper C. A hollow rectangular dribble stream receptacle 67 may be mounted between the bulk-stream receptacles 65, 65 on a bracket 68 which, together with the feeding hopper C, is supported in any suitable manner by the frame 40, Fig. 1.

The discharge spout B, Figs. 6 and 7, comprises a flanged portion 69 which fits over the end of the outlet tube 61 and is suitably secured thereto as by screws 70. One end of a passageway 71, which is of rectangular cross-section, is positioned at the bottom of outlet tube 61 so as to receive material from the lower portion of the feed screw 52. The lower end of passageway 71 is positioned above and in alignment with the dribble stream receptacle 67 so that the compacted material carried by the lower portion of feed screw 52 is delivered into the dribble stream receptacle 67. The discharge spout B further comprises the upper passageways 72, 72 which receive material from the upper portion of the feed screw 52. As is apparent from Fig. 7, the upper passageways 72, 72 are curved in opposite directions so that the material passing through said passageways 72, 72 is directed into the respective bulk-stream receptacles 65, 65, Fig. 4. The upper passageways 72, 72 may be of rectangular cross-section and are considerably larger than the lower passageway 71. Accordingly, when the feed screw 52 is filled with material, a considerably greater amount of material will be delivered to the bulk-stream receptacles 65, 65 than to the dribble stream receptacle 67. The three passageways are slightly larger at the discharge end and are tapered so as to permit an easy release of the material.

The discharge spout B also insures a substantially uniform flow of material to the dribble stream receeptacle 67, despite large variations in the amount of material fed to the hopper 41. This is accomplished by locating the passageway 71 at the bottom of the tube 61. Thus, if only a small amount of material is fed to the feed screw 52 from the hopper 41, this material will be carried along the bottom of tube 61 and through the lower passageway 71 into the dribble stream receptacle 67. Consequently, the lower passageway 71 leading to the dribble stream receptacle 67 must be completely filled before any material will pass through the upper passageways 72, 72 into the bulk stream receptacles. Accordingly, as long as sufficient material is fed into the hopper 41 to fill lower passageway 71, a uniform stream of material will flow to the dribble stream receptacle 67. This feature is an aid in obtaining fairly accurate weights even when the supply in the bin is low. Moreover, the filling spout B divides the material into three streams and thus distributes the material over a larger area. The area of filling hopper C can, therefore, be increased and the height of the machine can be correspondingly reduced without changing the capacity of the filling hopper C.

Suitable discharge openings are provided at the bottom of the bulk-stream receptacles 65, 65, these discharge openings being provided with the respective outlet gates or bulk gates 75, 76 which are shown in their closed position in Fig. 4. Each of the bulk gates 75 and 76 has a side piece 77 extending along each side thereof, the side pieces 77 being secured to the bulk gates 75 and 76 in any suitable manner. Each bulk gate 75, 76 is mounted on a pair of levers 78, 78, Fig. 6, suitably secured to the respective side pieces 77, 77, said levers 78, 78 being pivoted on opposite sides of the bracket 68 as at 79, 79, respectively. The pivots for each bulk gate are in alignment and all of the pivots are disposed in the same horizontal plane. As shown in Fig. 4, the inner lever 78 on bulk gate 75 is connected by a link 80 to one end of an arm 81 which is mounted on a shaft 82 journaled in the filling hopper C. The other end of the arm 81 is connected by a link 83 to the inner lever 78 on bulk gate 76. With an arrangement of this character and referring to Fig. 4, the bulk gates 75, 76 are adapted to open in unison, the bulk gate 75 moving clockwise on its pivots 79 and the bulk gate 76 moving counterclockwise on its pivots 79. The weight of the bulk gates 75, 76 urges them to the closed position shown in Fig. 4 at which position further downward motion of the bulk gates 75, 76 is prevented by engagement thereof with a stop 84 mounted on filling hopper C in any suitable manner. Referring to Fig. 6, it will be seen that shaft 82 has an arm 85 secured thereto which is connected to a control link 86. When the bulk gate control link 86 is moved upwardly by cam action, as will be hereinafter described, the bulk gates 75, 76 are moved to open position.

Referring to Fig. 5, it will be apparent that there is a small longitudinally-extending chamber 87 at each side of the bulk gate 76. The bottom of each chamber 87 is defined by the bulk gate 76, the inner side by the adjacent bulk stream receptacle 65, the outer side by the adjacent side piece 77 and the top by flanges 88, 89 extending, respectively, from said side piece 77 and said bulk stream receptacle 65. There is a clearance gap 90 between the flanges 88 and 89 and there is a clearance gap 91 between the bottom of the bulk stream receptacle 65 and the bulk gate 76, these gaps being provided to allow clearance between the stationary and moving parts of the bulk gate assembly. When material is introduced into the bulk stream receptacle 65, a small amount accumulates within the chambers 87 and forms a seal therein so that the material functions as a baffle to prevent further material from flowing into said chambers. Due to the construction of said chambers 87 and the seal of material formed therein, none of the material leaks out through the gaps 90 so that a substantially leak-proof joint is obtained between the side pieces of the bulk gate 76 and the adjacent bulk stream receptacle 65. A generally similar construction is utilized to prevent material from leaking out around bulk gate 75.

As shown best by Fig. 4, a chamber 92 is formed at the inner end of the bulk gate 76, this chamber being defined by the stop 84, the bulk stream receptacle 65 and the bulk gate 76 when the latter is in closed position. A chamber 93 is formed at the outer end of the bulk gate 76, this chamber being defined by a flange 94 on bulk gate 76, the bulk stream receptacle 65 and the bulk gate 76 when the latter is in closed position. These chambers 92, 93 act as baffles to prevent leakage from the bulk stream receptacle 65 at the inner and outer ends of the bulk gate 76, respectively. A similar arrangement is provided to prevent leakage from the inner and outer ends of the bulk gate 75.

Accordingly, it will be apparent that there are substantially leak-proof joints between the bulk gates 75, 76 and the bulk stream receptacles 65, 65, respectively, which effectively prevent material from passing out of the bulk stream receptacles when the gates are closed. This is a very important feature when the machine is used for packing starch or other fluid-like free-flowing material as leakage from the bulk stream receptacles 65, 65 might seriously impair the accuracy of the weights.

The dribble stream receptacle 67 is provided with a dribble gate 100 having an aperture 101, Figs. 6 and 8, which is aligned with the lower open end of the dribble stream receptacle 67 when the dribble gate 100 is in the open position, as shown in Figs. 6 and 8. Limit-stop flanges 100A are provided upon the gate 100 to define the limits of movement of the gate. One end of the dribble gate 100 is pivoted as at 102 to a link 103 which is connected to the bracket 68 as at 104. The other end of the dribble gate 100 is pivoted at 105 to one end of a lever 106 which is fulcrumed on the bracket 68 at 107, the other end of lever 106 being pivotally secured to a control link 108 as at 109. When the link 108 is lowered, Fig. 6, dribble gate 100 is moved from the open position shown in Fig. 6 to the closed position thereof, this motion of the dribble gate 100 being limited when it touches the bottom end of the dribble stream receptacle 67. It will be seen that the supporting levers for the dribble gate swing in an arc so that the gate moves upwardly a short distance as it is closing into sealing engagement with the lower end of the receptacle 67. One end of a spring 111 is secured to the upper end of control link 108, the other end of spring 111 being secured on a bracket 112 which is mounted on a housing 113 in any suitable manner. It will be apparent that spring 111 urges the dribble gate 100 toward closed position. When control link 108 is raised, the dribble gate 100 is moved to the open position shown in Fig. 6 in which the opening 101 is aligned with the receptacle 67.

The weighing scale

When the bulk gates 75, 76, Fig. 4, and the dribble gate 100 are in open position, material may be discharged therethrough into a weighing receptacle D which is pivoted on a scale E, Fig. 9. The scale E may comprise a pair of parallel horizontally-extending scale beams 120, 120 which are connected by suitable transversely-extending bars 121. The scale beams 120, 120 are mounted, respectively, on pivots 122, 122. Each pivot comprises a knife edge bearing 123, Fig. 10, which is rigidly secured to the adjacent scale beam 120. The knife edge bearing 123 rests upon a bearing block 124 which is keyed to a pin 125. Suitable bearing supports 126, 126 are provided to hold the pin 125 in its proper position, bearing supports 126, 126 being supported by a standard 127 which is mounted in any suitable manner on the frame 40, Fig. 1. The rear portion of the scale comprises a frame 128, Fig. 9, to which a main weight 129 is attached as by screws 130. Auxiliary weights 131, 131 may be secured to the sides of main weight 129 in any suitable manner in order that the scale may be used for weighing charges of material of different weights. A small counter-poise weight 132 may be adjustably mounted on a rod 133 which may be secured to suitable supports 134 extending from one of the scale beam arms 120. The counter-poise weight 132 may be utilized to obtain the final accurate adjustments of weight for the scale E.

The scale beams 120, 120 may be provided, respectively, with pivots for supporting the weighing receptacle D. Each of the pivots may comprise an upwardly-extending knife edge bearing 135, Fig. 10, which is rigidly mounted on the adjacent scale beam 120. The knife edge bearing 135 may be engaged by a bearing block 136 which may be secured to the weighing receptacle D as by screws 137. As stated, the middle portion of the scale beams 120 are pivotally mounted on the respective standards 127, the scale beams having the main weight 129 and auxiliary weights 131, 131 at one end thereof while the weighing receptacle D is suspended from the other end thereof. When the weighing receptacle D has little or no material therein, the weights move downwardly, Fig. 10, until a screw 138 on the main weight 129 engages a stop 139 mounted on the frame 40. As the desired weight of material flows into the weighing receptacle D, the scale beam pivots on the bearings 122 with the result that the screw 138 is lifted out of engagement with the stop 139 and the weighing receptacle D is depressed.

The tripping mechanism

Figure 10:
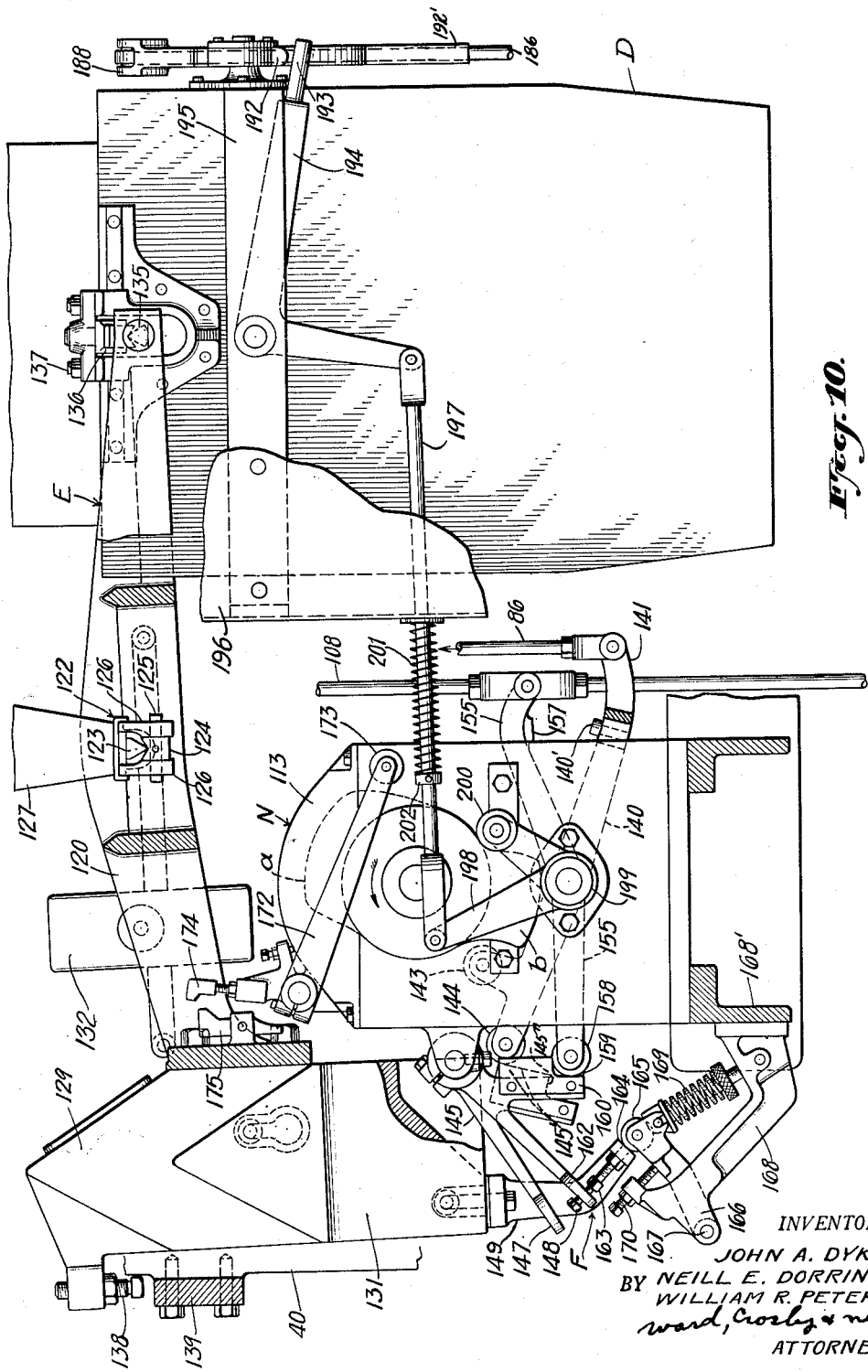
Fig. 10 is a side elevational view, partially broken away, of the scale, the weighing receptacle and the scale tripping device.

The tripping mechanism F for cutting off the supply of material to the weighing receptacle D after the desired amount of material has been fed thereto will next be described. The bulk gate control link 86, Figs. 6, 9 and 10, is attached to the fork 141 of a lever 140, Fig. 9, and the dribble gate control link 108 extends through the fork 141. The lever 140 is integral with a sleeve 142, Fig. 9, which is mounted within the housing 113, Fig. 10, as will be hereinafter more fully described. The lever 140 carries a roller 143 which is engageable with a cam a, the operation of which will be described later. A roller 144 on lever 140 engages a bulk gate latch 145 which is pivoted to the housing 113 on a pin 146, Fig. 30. A finger 147 forming a part of latch 145 may be engaged by a bulk gate trip screw 148 mounted on a bracket 149 which may be secured in any suitable manner to the main weight 129 of scale E.

The dribble gate control link 108 is pivoted to a lever 155 which is integral with a sleeve 156, Fig. 9, the sleeve 156 being mounted within the housing 113 as will hereinafter be described. Lever 155 has a projection 157, Fig. 10, thereon which may be engaged by a suitable set screw 140' mounted on lever 140. A roller 158 is mounted on lever 155, roller 158 being shown in engagement with a recessed portion 159 of a dribble gate latch 160 which is pivoted to the housing 113 on a pin 160', Figs. 10 and 30. The latch 160 has an integral finger 162 extending therefrom which may be engaged by a dribble gate trip screw 163 mounted on the bracket 149. The lower portion 164 of bracket 149 may be engaged by a roller 165 mounted on an arm 166 which may be pivoted as at 167 on a bracket 168 extending from the housing 168'. The roller 165 is urged into engagement with the lower bracket portion 164 by a compression spring or booster spring 169 and a stop is provided as at 170 for limiting the pivotal motion of arm 166.

With the parts in the position shown in Fig. 10, the bulk gates 75, 76, Fig. 4, are in closed position. When the bulk gates are closed, control link 86, Fig. 10, is in its lowermost position and roller 144 is in engagement with a plane surface 145' of latch 145. When lever 140 is moved by the cam a in a counter-clockwise direction, Fig. 10, control link 86 moves upwardly to thereby open the bulk gates 75, 76, Fig. 4. At the same time, roller 144 moves downwardly along the aforesaid plane surface 145' and thence into engagement with a recessed portion 145'' of latch 145. Thereupon, latch 145 is moved in a counter-clockwise direction, Fig. 10, by its own weight so that the recessed portion 145'' is retained in engagement with roller 144 to thereby lock the bulk gates 75, 76 in their open position.

During the weighing operation, the bulk gates 75, 76 are locked in the described open position and the dribble gate 100 is in open position, as shown. The dribble gate is moved to open position, as will be hereinafter explained, by engagement of the set screw 140' with the projection 157. When the bulk and dribble gates are in the positions last noted, the dribble gate control link 108 and bulk gate control link 86 are in their upper positions, the rollers 144 and 158 being locked in engagement with the respective latches 145 and 160. Accordingly, a relatively large stream of material or bulk stream flows into the weighing receptacle D, Fig. 4, from the bulk stream receptacles 65, 65 and a relatively small stream of material or dribble stream flows into the weighing receptacle D from the dribble stream receptacle 67. The scale weights 129 and 131, Fig. 10, are loaded or weighted so that the scale does not move until a predetermined amount of material is introduced into the weighing receptacle D. Preferably, this predetermined weight is 8 or 10 pounds less than the final desired weight of the charge. When this predetermined amount of material is introduced into the weighing receptacle, the weight thereof and the kinetic energy of the uniformly flowing stream of material together with the pressure exerted on the scale by the booster spring 169 cause the main weight 129, weights 131, and the attached bracket 149 to move upwardly, the screw 138 at the top of the scale moving away from the stop 139. Responsive to this upward motion of bracket 149, the bulk gate trip screw 148 engages the finger 147 to thereby move latch 145 in a clockwise direction, Fig. 10, the recessed portion 145'' thus moving out of engagement with roller 144. Thereupon, the weight of the bulk gates 75 and 76, Fig. 4, urges them to closed position and bulk gate control link 86 moves downwardly, Fig. 10 to thereby move the lever 140 and latch 145 to their respective positions as shown in Fig. 10. Accordingly, the bulk stream is cut off, the relatively small dribble stream continuing to flow into the weighing receptacle D from the dribble stream receptacle 67.

As the bracket 149 moves upwardly in the described manner, the roller 165 is held in engagement with the lower bracket portion 164 by the booster spring 169. However, as soon as the finger 147 is engaged by the bulk gate trip screw 148 to thereby cause the bulk gates to close, the arm 166 engages stop 170 with the result that the pressure of the spring 169 is removed from the lower bracket portion 164. As hereinbefore stated, the weight and kinetic energy of the material flowing into the weighing receptacle together with the effect of the booster spring 169 caused the initial upward movement of the main weight 129 and the attached bracket 149. Accordingly, when the action of the spring 169 is discontinued, the upward motion of the main weight 129 and bracket 149 is stopped momentarily until sufficient material is fed into the weighing receptacle D from the dribble stream receptacle so that the weight and kinetic energy thereof compensate for the pressure which was exerted upon the scale by the booster spring 169 before closure of the bulk gates. This occurs when the final desired weight of material has been fed to the weighing receptacle D. At this time, the scale beam again moves, the bracket 149 moving upwardly until the dribble gate trip screw 163 engages the finger 162. Thereupon, the latch 160 moves in a clockwise direction, Fig. 10, the recessed portion 159 moving out of engagement with the roller 158 thus freeing the lever 155 for movement in a clockwise direction. The spring 111, Fig. 6, then urges the control link 108 downwardly to thereby move the dribble gate 100 to its fully-closed position and cut off the dribble stream. The dribble gate 100 is preferably formed from very light material so that it will close rapidly and promptly when the dribble gate trip screw 163, Fig. 10, engages the finger 162. Accordingly, as soon as the final desired weight of the material is introduced into the weighing receptacle, the dribble stream is immediately cut off and a very accurate weighing operation is thereby obtained.

It will be appreciated that, during the initial stages of the weighing operation, both the dribble stream and the bulk stream flow into the weighing receptacle D. When a predetermined weight is reached, the bulk gates 75, 76 close to thereby cut off the bulk stream. The relatively small dribble stream continues to flow into the weighing receptacle D until the desired final weight is reached at which time the dribble gate 100 closes to thereby cut off the supply of material to the weighing receptacle. The uniformity of the stream of material flowing into the receptacle D causes the scale to move smoothly and the kinetic energy of the stream tends to power the scale so that the latches 145 and 160 are tripped very easily. The charge is then dumped from the weighing receptacle, as will be hereinafter described. After the charge is dumped, the lever 140, Fig. 10 is moved in a counter-clockwise direction by the cam a, and the bulk gates 75, 76 open in the manner hereinbefore described. This movement of lever 140 causes the projection 157 of lever 155 to be engaged by the set screw 140' on lever 140 to thereby rotate lever 155 in a counter-clockwise direction and move the dribble gate to open position. It will be understood that a reserve supply of material builds up in the bulk stream receptacles 65 when the bulk gates are closed, this reserve supply entering the weighing receptacle when the bulk gates are first opened with the result that the weighing cycle is considerably shortened.

A device may be provided to lock the scale in position while the aforesaid reserve supply of material drops into the weighing receptacle D thus preventing the scale E from being jarred to an overbalanced position. This device may comprise a lever 172, Fig. 10, pivoted to the housing 113. A roller 173 on lever 172 is adapted to be engaged by the lobe of a cam b, the operation of which will be described later, before the reserve supply of material drops into the weighing receptacle. Lever 172 moves in a counter-clockwise direction, Fig. 10, so that a finger 174 mounted on the lever 172 engages a stop 175 on the scale to thereby prevent motion of said scale. After the reserve supply of material drops into the weighing receptacle, the lobe of cam b moves out of engagement with the roller 173 and the lever 172 returns to the position shown in Fig. 10 by spring action.

*The weighing receptacle*

The weighing receptacle D, Fig. 9, comprises two chambers 176, 176 which are separated by a V-shaped member 177. Suitable apertures are provided at the bottom of each of the chambers 176, 176 which are normally closed by dump gates 178, 179, Fig. 4.

Each of the dump gates 178 and 179, at each side thereof and midway between its edges, is supported by a suitable fixture 180. Each fixture 180 has a flanged portion 181, Fig. 6, secured to the lower dump gate surface and each fixture is pivoted as at 182 to a bracket 183 carried by the receptacle D. The pivots for each dump gate are in alignment and all of the pivots are disposed in the same horizontal plane. As shown in Fig. 4, the outer fixture 180 for the dump gate 179 comprises an upwardly extending arm 184 to which is pivoted one end of a link 185 which, at its other end, is pivoted to the outer fixture 180 for the dump gate 178. With an arrangement of this character and referring to Fig. 4, the dump gates 178 and 179 are adapted to open in unison, the dump gate 178 moving clockwise on its pivots 182 and the dump gate 179 moving counter-clockwise on its pivots during such opening movement. Obviously, the reverse action takes place during closing movement of the dump gates.

The dump gates 178, 179 are controlled by an over-center toggle lock which comprises a rod 186, the lower end of which is pivoted to one of the outer fixtures 180, the upper end of rod 186 being pivoted at 187, Fig. 2, to a locking member 188 which is movably mounted on the weighing receptacle D as at 189. In the position shown, a surface of the rod 186 engages locking member 188 at 190 to thereby lock the dump gates 178, 179 in the closed position shown in Fig. 2. It will be understood that the dump gates 178, 179 remain in this locked, closed position while a weighed charge of material is being introduced into the weighing receptacle D. The portion of locking member 188 indicated at 191 is formed from steel or other heavy material so that said portion 191 acts as a counterweight tending to urge locking member 188 in a counter-clockwise direction, Fig. 2, and tending to urge the dump gates 178, 179 toward closed position. A lug 192 on the locking member 188 may be engaged by a rod 193 in order to open the dump gates 178, 179 as will be explained later. However, rod 193 is normally spaced from lug 192 in order that the weighing receptacle D may be freely suspended from the scale during the previously described weighing operation. Rod 193 is mounted on an arm 194, Fig. 10, which is fulcrumed on a bracket 195 mounted on a fixed housing 196 which substantially encloses the weighing receptacle D and is supported, in any suitable manner, from the frame 40 as will be more fully described hereinafter. A rod 197 extends through the housing 196, Fig. 6, and connects arm 194 with an arm 198 which is integral with a sleeve 199 supported by the housing 113 in a manner to be described more fully hereinafter. Arm 198 carries a roller 200, which is urged into engagement with the cam b by a spring 201 mounted between the housing 196 and a collar 202 on rod 197. The timing and operation of the cam b will be described in detail later.

After a weighed charge of material has been introduced into the weighing receptacle D, arm 198 and roller 200 are moved by the lobe of the cam b in a clockwise direction, Fig. 10, causing the rod 193 to move upwardly to thereby engage the lug 192 and move locking member 188 in a clockwise direction, Fig. 2, thus moving the surface 190 of lever 186 out of engagement with the locking member 188. The weight of the material in the weighing receptacle D, which is considerably greater than that of the counterweight portion 191, causes the dump gates to swing open thus dumping the weighed charge of material from the weighing receptacle. As the dump gates 178, 179 swing open, the locking member 188 is rotated in a clockwise direction until a finger 192' thereon engages the control rod 193. After the charge has been dumped, arm 198, Fig. 10, responsive to the action of the spring 201, returns to the position shown in Fig. 10, thus causing the control rod 193 to move downwardly to thereby rotate the finger 192', Fig. 2, and the locking member 188 in a counter-clockwise direction, thus closing the dump gates 178, 179, and moving the lever 186 into locking engagement with the locking member 188 at the surface 190. This counter-clockwise movement of locking member 188 is effected in part by the described downward motion of control rod 193 and in part by the counterweight portion 191 which may, if desired, be made sufficiently heavy to bias the dump gates 178, 179 to closed position without the necessity of providing closing means such as the finger 192'.

A check rod 203, Figs. 4 and 6, may be provided to steady the weighing receptacle D and prevent excessive swinging thereof when the material is introduced into the weighing receptacle. A slotted portion 205 at one end of the check rod 203 engages a rod 204 which is mounted on a bracket 206 on the housing 196. The other end of check rod 203 may be pivoted upon a pin 207 which is mounted on a fixture 208 on the bracket 183. It will be apparent that the check rod 203 prevents excessive swinging of the weighing receptacle D toward and away from the housing 196, Fig. 6.

*The deflector unit and filling hopper*

As shown, the housing 196, Fig. 2, may be supported from the frame 40 in any suitable manner, the housing being divided at the bottom thereof into two compartments or filling hoppers H, H by an inverted V-shaped wall portion 211. The weighed charges of material which are dumped from the weighing receptacle D are directed alternately into the filling hoppers H, H by deflector mechanism indicated generally at G.

Partitions 212, 212 which converge upwardly are mounted within the housing 196 in any suitable manner, each partition having an inclined upwardly-extending plate member 213 secured thereto which may be flanged as at 213'. The partitions 212 and plate members 213 divide the middle portion of the housing 196 into two air chambers 214, 214 and a central passage 215, the latter receiving material from the weighing receptacle D. The air chambers 214, 214 have vents at 216, 216, respectively, which communicate with the upper portion of the filling hoppers H, H, each of the vents 216 being defined by a reinforcing plate 216' mounted within the adjacent air chamber 214, Fig. 13. A pair of inclined baffle plates 217, 217, Fig. 2, are mounted at opposite sides of the housing 196, the lower portion of each baffle plate 217 being parallel to the upper portion of the adjacent plate member 213 to thereby define a vent 218 communicating with the passage 215.

The deflector mechanism G comprises a shaft 220 which is journaled in the housing 196 at the top of the inverted V-shaped wall portion 211, shaft 220 extending through a plate 221, Fig. 12, at the front of the housing 196 and a plate 222 at the rear of the housing 196. A pair of plates 223, 223, Figs. 11 and 12, are mounted on the shaft 220 adjacent the front and rear portions, respectively, of the housing 196, the plates 223 being oscillatory with the shaft 220. The top of each plate 223, Fig. 12, is sealed by a member 224 secured to the housing 196 and extending inwardly therefrom, each member 224 having a plate 225 secured thereto which is closely adjacent the inner surface of the plate 223. A deflector plate 226 disposed between the plates 223 extends radially from the shaft 220 and is secured thereto. Deflector plate 226 is normally in engagement with one of a pair of stop members 227 which are secured to the respective flanges 213'.

The shaft 220 has an arm 228, Fig. 12, secured thereto rearwardly of the housing 196, arm 228 being pivoted to the lower end of a link 229. An arm 230 is secured to the upper end of the link 229, arm 230 being mounted on a sleeve 231 within the housing 113, Figs. 1 and 12, as will be hereinafter described. The arm 230 carries a roller 232 which is coactable with a cam c, the operation of which will be described later. One end of a spring 233 is mounted on a lug on the arm 230, the other end of the spring 233 being secured to a bracket 234 suitably secured to the housing 113. The spring 233 urges the oscillatory structure comprising the shaft 220, the plates 223 and the deflector plate 226 in a clockwise direction, Fig. 11, this movement being limited by engagement of the deflector plate 226 with the right hand stop member 227. It will be understood that the roller 232 does not engage the cam c when the deflector plate 226 is in engagement with the right hand stop member 227, Fig. 11. With the deflector plate 226 in this position, a charge of material dumped from the weighing receptacle D is directed by the deflector plate 226 and the plates 223 into the left hand filling hopper H. When the charge passes into the filling hopper H in this manner, the air displaced therefrom may pass upwardly through the left hand vent 216, Fig. 2, into the left hand chamber 214. Most of the material carried along with the air current settles out in said chamber 214 and falls back into said filling hopper H through said vent 216. The air current, which may still carry a small amount of material passes from the upper part of said chamber 214 and is then directed downwardly through the vent 218 and passage 215 into the filling hopper H. In this manner, very little of the material is carried away in the form of dust and exceptionally dust-free operation is obtained.

When the deflector plate 226 was in the position last described, the cam roller 232 was spaced from the low part of the cam c. During operation of the mechanism, as hereinafter described, the cam c is rotated through an angle of 180 degrees to thereby position the cam roller 232 in engagement with the lobe of said cam c. As a result, the arm 230 is moved in a counter-clockwise direction, Fig. 12, to thereby elevate the link 229 and move the oscillatory structure comprising the shaft 220, the plates 223 and the deflector plate 226 in a counter-clockwise direction, Fig. 11, this movement being limited by engagement of the deflector plate 226 with the left hand stop member 227. With the parts in this position, a charge of material from the weighing receptacle D will be directed into the right hand filling hopper H, the operation occurring in generally the same manner hereinbefore described with respect to the left hand filling hopper H. A pointer 235 may be mounted on the shaft 220 to indicate the filling hopper H to which the next charge of material will be delivered. A counter 236, Fig. 11, may be mounted on the plate 221 and connected to the shaft 220 by suitable links indicated generally at 237 so that the counter registers each time the deflector plate 226 is moved. In this manner, a count of the number of weighed charges of material delivered to the filling hoppers H, H is obtained.

The remainder of the apparatus, with the exception of the control apparatus and the driving mechanism, is divided into two substantially identical sets of mechanism. Hence, only the mechanism on the left hand side of the machine, Fig. 2, will be described and, except where otherwise specified, it will be understood that the mechanism is duplicated on the right hand side of the machine.

A cylindrical outlet tube 240, Fig. 14, is provided at the bottom of the filling hopper H. A tapered filling spout 241 is secured to outlet tube 240 in any suitable manner, the outer end portions of the filling spout being broken away in the conventional manner so that, as hereinafter described, a bag may be readily placed upon the spout and filled by material discharged therefrom. A tapered filling screw 242 integral with shaft 243 which is journaled in the filling hopper H, the filling screw 242 preferably extending all the way across the filling hopper H and into the tapered portion of the spout 241. The pitch of the filling screw 242 is such that rotation thereof causes material to be fed from the hopper H, through the filling spout 241 into the bag. The shaft 243 may be driven, in the manner hereinafter described, by a sheave 244 which is disposed outside the filling hopper H. The shaft 243 may also carry a sheave 245 for a purpose to be explained later. A sheave 247 is mounted on a shaft 248 which is suitably journaled in the filling hopper H above the shaft 243. Sheaves 244', 245' and 247' are provided at the right hand side of the machine, these sheaves having the same function as the sheaves 244, 245 and 247, respectively. The respective sets of sheaves are disposed in different vertical planes, Fig. 14, so that they may be driven from a common shaft as will be hereinafter described. An agitator screw 249 is mounted on the shaft 248, agitator screw 249 being of opposite pitch with respect to filling screw 242. Accordingly, agitator screw 249 directs material into the emptying flights at the rear of the filling screw 242 to thereby keep the filling screw 242 substantially filled with material as a bag is being filled. In this manner, the filling time is considerably shortened with the result that a higher output is obtained from the machine.

The bag clamp

A clamp I is mounted on a bracket 250 which is suitably secured to the cylindrical outlet tube 240. The clamp I is manually operated to secure a bag in feed-receiving relation with respect to the filling spout 241 and is automatically released after the bag has been filled. The end portion 251 of bracket 250 is forked to receive a pin 252, Fig. 16, upon which a clamp lever 253 is pivoted. A locking handle 254, Figs. 1 and 14, is pivoted to the clamp lever 253 as at 255. The locking handle 254 has a downwardly-extending projection 256 on which a finger 257 is mounted in any suitable manner. A spring 258, Fig. 1, is attached to clamp lever 253 and handle 254, spring 258 tending to move the handle 254 in a clockwise direction about pivot 255, thereby urging finger 257 into engagement with an arcuate fixture 259 which is mounted, in any suitable manner, upon the bracket 250.

The lower end of clamp lever 253 has pivoted thereto at 260, Fig. 14 a roller 260' in rolling contact with a clamping member 261 which, in turn, is pivoted to the bracket 250 as at 262. The clamping member 261, Fig. 16, comprises a pair of spaced downwardly-extending side pieces on which are mounted, respectively, a pair of pads 263, 263 formed preferably of rubber. When a valved bag, as diagrammatically indicated at 264, Fig. 1, is placed upon a filling spout 241 and the clamp I is moved to the closed position shown in Figs. 1 and 16, the pads 263, 263 press the upper surfaces of the bag firmly against the filling spout 241 to thereby clamp the bag in position thereon. If the bag has an upper sewed strip as at 265, this strip will fit into the space between the pads 263, Fig. 16 when the bag is clamped upon the filling spout 241.

One end of a link 266, Fig. 14, is pivoted on a lug 267 on clamp lever 253, the other end of link 266 being pivoted to an arm 268 extending from a rockshaft 269 which is journaled on the filling hopper H. Rockshaft 269 also carries an arm 270 which is connected by a link 271 to the upper end of a lever 272 which is pivotally mounted on the frame 40 as at 273. The upper end of the lever 272 is also pivotally connected by a link 274 to an arm 275 which is mounted on a rockshaft 276 suitably supported on the filling hopper H. An arm 277 on rockshaft 276 is pivotally connected to a link 278, Figs. 1 and 14. The link 278 extends vertically upward to a position adjacent the housing 113 where it is pivoted at 279 to an arm 280, Figs. 1 and 29, which is integral with a sleeve 281 journaled on a shaft hereinafter to be described, in the housing 113. An arm 282 extends from sleeve 281, arm 282 carrying a roller 283 which is operatively associated with a cam d rotatably mounted and timed as will be described hereinafter.

When the lobe of cam d engages the roller 283, the sleeve 281 and arm 280 are moved in a counter-clockwise direction, Fig. 29, whereby the link 278, Figs. 14 and 29, is raised to thereby move links 271 and 274 to the left, Fig. 14. Responsive to this motion of the links 271 and 274, link 266 is moved to the right, Fig. 14, to thereby move the clamp lever 253 in a clockwise direction about the pin 252 with the result that the clamping member 261 is lifted out of engagement with the bag. This clockwise motion of clamp lever 253 is aided by a spring 284 which is secured to the bracket 250 and to the clamping member 261. As the clamp lever moves, the finger 257 moves along the surface of the arcuate fixture 259 in a clockwise direction, Fig. 14, until said finger 257 slips over the end surface 285 of fixture 259 to thereby lock the clamp in open position.

As will appear more clearly hereinafter, the clamp I is released in the described manner after a weighed charge of material has been fed into the bag 264 and the bag is then automatically removed from the filling spout 241. Thereupon, a new bag is positioned upon the filling spout 241 and the finger 257 is moved out of engagement with the end surface 285 by manually pressing the handle 254 toward the clamp lever 253. The clamp lever 253 may then be moved manually in a counter-clockwise direction, Fig. 14, to thereby move the clamping member 261 into engagement with the bag surface and hold the new bag firmly in position upon the filling spout 241.

The bag chair and bag pusher

While the bag is being filled through the filling spout 241, the bottom of the bag is supported by a bag chair J, Figs. 18, 19 and 20. The bag chair J has saddle-shaped top portions 290, 290, Fig. 19, which are joined by a U-shaped frame portion 291. The saddle portions 290, 290 and frame portion 291 are of sufficient length to accommodate the bag 264, Fig. 18. The bar chair J is pivotally mounted on brackets 295, 295, Fig. 19, by screws 296, 296, respectively. A yoke 297 which is flanged as at 298, 298 is fixed to the brackets 295, 295. The screws 296, 296 have inner non-threaded portions upon which the bag chair J is pivoted. Each of the brackets 295 is suitably secured to a frame 299, Fig. 1, which is suspended on upper and lower leaf springs 300, 300 supported at one end by the frame 40.

A member 301, Figs. 18 and 20, extends outwardly from the bag chair J, member 301 having an inclined surface 302 which is engageable with a projection 303 on yoke 297 to thereby limit the motion of bag chair J in a clockwise direction, Fig. 20, about the screws 296. The member 301 engages one of the brackets 295 as at 304 when the bag chair J is in horizontal position, as shown.

The bag chair J is urged to this horizontal position by a spring 305 which is secured to the bag chair J as at 306 and to one of the brackets 295 as at 307. A roller 308 is mounted on the member 301, roller 308 normally being engaged by a locking lever 309 which is pivoted to bracket 295 as at 310. A link 311, which is pivoted to locking lever 309 at 312, extends through a suitable aperture in frame 299, link 311 being pivoted at 313, Figs. 20 and 21, to a link 314 which, in turn, is pivoted at 314' to a rod 315 fixed to the frame 299. A compression spring 316 is disposed between the frame 299 and a collar 317 on link 311 to thereby urge link 311 leftwardly, Figs. 20 and 21, which, in turn, urges locking lever 309 into engagement with roller 308.

The link 314, Fig. 21, has a screw 324 mounted thereon which may be engaged by a bracket 325, Figs. 1 and 21, secured to a rod 326 in any suitable manner. Rod 326 is movable in slideways 327, 327 which are mounted on a housing 328. Suitable brackets 329 may be provided to support the housing 328 in desired position on the frame 40. A pushing member L, Figs. 15 and 18, is mounted on the rod 326 and extends through a suitable aperture in the frame 299 and the rod 326 is pivoted to the aforementioned lever 272 as at 330. The pushing member L comprises a pair of spaced side pieces 331, 331, on which are mounted, respectively, a pair of pads 332, 332. The pads 332 are adapted to engage the side of a filled bag and impart a pushing movement thereto. There is an aperture 333 between the side pieces 331 into which the collapsed side of an empty bag may fit.

After the bag has been filled, the link 278, Fig. 1, is moved upwardly by cam action, as hereinbefore stated, to thereby move lever 272 in a counter-clockwise direction about the pivot 273. Responsive to this movement of lever 272, the clamp I is released in the manner hereinbefore described. The movement of lever 272 also causes the rod 326 to move to the right, Fig. 1, whereupon pushing member L engages the bag and pushes it away from the machine, the bottom of the filled bag moving longitudinally along the saddle portions 290. When the side of the bag which is engaged by the pushing member L reaches the middle of the bag chair J, only the tip of the filling spout 241 remains inside the bag and the weight of the bag is shifted so that the bag chair J tends to tilt about the screws 296. As the bag reaches this position, the lever 325 engages the screw 324, Fig. 21, and moves the link 314 in a counter-clockwise direction about the pivot 314' to thereby move link 311 to the right, Figs. 20 and 21, thus releasing the locking lever 309 from engagement with roller 308. Thereupon, the weight of the bag tilts the bag chair J about the screws 296, the bag chair J moving in a clockwise direction, Fig. 20, until the inclined surface 302 engages the projection 303. This tilting of the bag chair J is sufficient to allow the bag to slide off the bag chair onto a trap door which is indicated at M in Fig. 18, the valved portion of the bag slipping off the tip of the filling spout 241 at this time. As soon the the weight of the bag is removed from the bag chair J, the spring 305, Fig. 20, urges the bag chair back to the horizontal position, as shown. Thereupon a new bag is placed upon the filling spout 241, the empty bag fitting into the aperture 333, Fig. 15, in the pushing member L (Fig. 1) which is still in its rightward position. Thereupon the lever 272, Fig. 1, is moved in a clock- wise direction by closure of the clamp I to return the rod 326 and the pushing member L to the respective positions shown in Fig. 1, the bracket 325 moving out of engagement with the screw 324, Fig. 21. The spring 316 then urges the locking lever 309 back into engagement with the roller 308. When the clamp I is locked, pushing member L returns to the position shown in Fig. 1, and the new bag is ready to be filled in the described manner.

*The settler mechanism*

When a bag is being filled as described above, an oscillatory or jigging movement is imparted to the frame 299 and the bag chair J by settler mechanism which is generally indicated at K, Figs. 1, 14, 17, 18, 19 and 20. The frame 299 has a plate 340, Figs. 1 and 14, secured thereto on which there is mounted a pad 341 of rubber or other shock absorbent material. A shaft 342 is journaled in the housing 328, shaft 342 having a sheave 343 mounted thereon for a purpose to be hereinafter described. The settler shaft on the right hand side of the machine has a sheave analogous to sheave 343 mounted thereon for a purpose to be explained later. The shaft 342 has an extension 344, Fig. 14, at the end thereof adjacent the plate 340, the extension 344 being offset with respect to the shaft 342. The extension 344 has a ball bearing 345 mounted thereon which carries a roller 346. It will be apparent that the roller 346 is rotatable with respect to shaft extension 344 and that rotation of shaft 342 causes the shaft extension 344 together with the roller 346 to rotate in a circular path about the axis of shaft 342. When a jigging motion is to be imparted to the bag chair J, roller 346 is in engagement with pad 341. As the shaft 342 rotates, the pad 341 moves with roller 346 so that a vertical oscillatory or jigging movement is imparted to the pad 341 causing said pad 341 together with the frame 299 and bag chair J, Fig. 1, to oscillate vertically on the leaf springs 300.

A catch block 347, Fig. 14, is mounted on the frame 299 and a recessed surface 348 of block 347 is adapted to be engaged by a roller 349, Figs. 14 and 17, mounted on a locking member 350 which is pivoted on the housing 328 as at 351. An arm 352 on locking member 350 has a rod 353 connected thereto, rod 353 being pivoted to the aforesaid lever 272 as at 354. One end of a compression spring 355 is secured to a collar 356 on rod 353, the other end of spring 355 abutting the arm 352. The spring 355 normally urges the arm 352 into engagement with a collar 357 on the rod 353. After a bag has been filled, the clamp I is released and lever 272 is moved by cam action in a counterclockwise direction as hereinbefore described, the rod 353 moving rightwardly, Fig. 14, so that the spring 355 urges the locking member 350 to move in a clockwise direction, Fig. 14, whereby the roller 349 engages the recessed portion 348 of catch block 347 and moves said catch block 347 together with the frame 299 upwardly a short distance so that the pad 341 moves upwardly out of engagement with the roller 346. Thereupon, the vertical oscillatory motion of the frame 299, and bag chair J is stopped at about the time the bag is completely filled.

When the clamp I is closed upon a new bag, the lever 272 is moved in a clockwise direction, Fig. 14 and the roller 349 moves out of engagement with the recessed portion 348 of catch block 347. Thereupon, the pad 341 moves downwardly a short distance into engagement with the roller 346 and an oscillatory jigging movement is again imparted to the bag chair J.

The trap door mechanism

Figure 24:
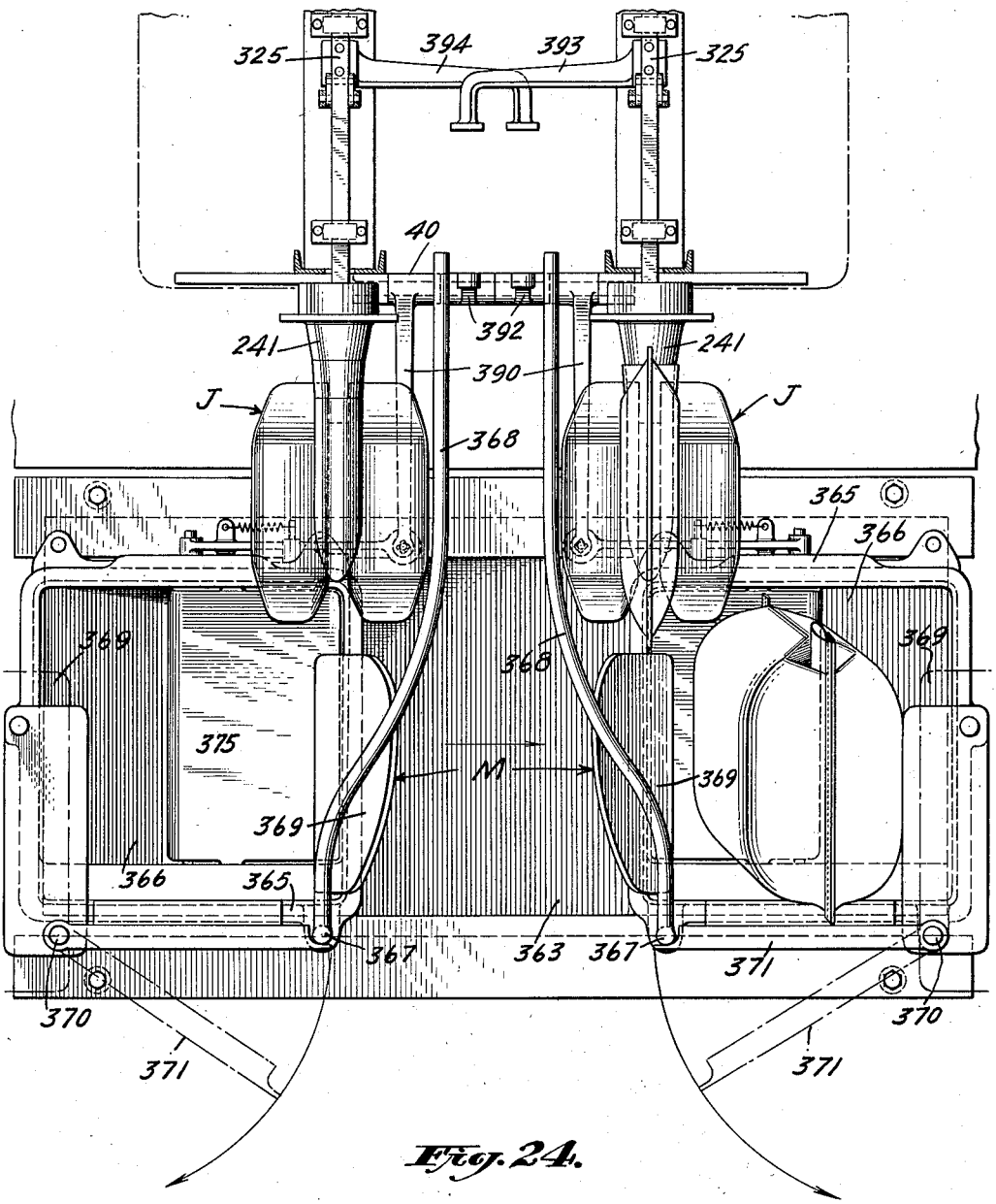
Fig. 24 is a plan view of the machine and the trap door mechanism associated therewith with the top portions of the machine omitted.

The trap door assembly M, Figs. 18, 22, 23 and 24, comprises a base 363 which is supported on a floor or other foundation 364, Fig. 18. Inclined frame members 365, 365 are secured to opposite sides of the base 363, frame members 365, 365 being disposed above suitable chutes 366, respectively, which are adapted to receive the filled bags. A supporting post 367, Fig. 24, is mounted on 365, each of the posts 367 having a guide rod 368 extending therefrom and connected to the frame 40, the guide rods 368, 368 guiding the filled bags into the respective frame members 365 as the respective bag chairs J are tilted and the filled bags slide off the latter and onto the trap door mechanism. Suitable sets of inclined plates 369 are provided at the sides of each frame member 365 so that a filled bag may slide to the trap door 375 and be retained in a substantially vertical position as well as a uniform position after it slides off the bag chair J onto the trap door mechanism. A supporting post 370 may be disposed at the outside of each of the frame members 365, each of the supporting posts 370 carrying a door 371 which, in its closed position, engages the supporting post 367. The doors 371 are provided to permit the removal of a bag from the trap door mechanism, for example, in order to check the weight of the bag.

The left hand trap door and tripping mechanism, Fig. 22, will be described next. A trap door 375, Figs. 22 and 23, is pivotally mounted inside each of the frame members 365, Fig. 24, on a shaft 376 which is journaled in suitable members 377 integral with the frame 365. The trap door 375 is preferably mounted in an inclined position, Fig. 18, with the highest portion thereof beneath the bag chair J. A rockshaft 378, Fig. 23, is journaled in the trap door 375, rockshaft 378 having a pair of latches 379 mounted at opposite ends thereof, respectively. Each latch 379 is normally engaged by a trigger 380 pivoted to the adjacent frame member 365 on a pin 381 and the triggers 380 are urged to the respective positions shown in Fig. 23, by compression springs as at 382, Fig 22. A pedal 385 is pivoted to the frame 365, the pedal 385 having an integral projection 387 on which is fixed a pin 388 which is adapted to engage one of the latches 379, Fig. 23. A similar trap door and trap door mechanism is provided at the right hand side of the machine, Fig. 22.

Each pedal 385 is normally engaged by one of a pair of levers 390, 390, Figs. 18 and 22, which are pivoted at 391 and 391, respectively, on the frame 40. A lever 392 extends upwardly from each of the levers 390 and is rotatable therewith, the lever 392 at the left hand side of the machine being somewhat longer than the lever 392 at the right hand side of the machine. As is apparent from the drawings, the lever 392 on the left hand side of the machine, Fig. 22, may be engaged by a lever 393 which is attached to the bracket 325, Figs. 1 and 24, on the right hand side of the machine, Fig. 24. In similar fashion, the lever 392 at the right hand side of the machine, Fig. 22, may be engaged by a lever 394 which is attached to the lever 325 on the left hand side of the machine, Fig. 24.

As the bracket 325 at the right hand side of the machine, Fig. 24, moves toward the bag chair J in response to counterclockwise movement of the associated lever 272, the lever 393 engages the left hand lever 392 to thereby depress the lever 390 on the left hand side of the machine, Fig. 22. Thereupon, the left hand pedal 385 is depressed, the pin 388, Fig. 23, moving the latches 379 and rockshaft 378 in a clockwise direction, Fig. 23, to thereby release the triggers 380 and permit the trap door 375 to be swung open by the weight of the bag, the bag dropping down through the trap door onto the adjacent chute 366. After the bag has dropped, a spring 395 which is attached to a pin extending from the trap door 375 at 396 and to a pin extending from the frame 365 at 397, urges the parts of the trap door mechanism back to the closed position shown in Fig. 22. If manual operation of the trap door mechanism is desired, the pedal 385 may be depressed by the foot of the operator and the parts for securing automatic operation of the trap door mechanism may be omitted. The right hand trap door is operated in similar fashion by movement of the left hand lever 325, Fig. 24.

The various operative steps hereinbefore described having reference directly to the bag-filling operation may be summarized as follows: A bag is preferably utilized which has a valve or aperture at the upper end thereof and, preferably, this valve or aperture has a sleeve therein, as indicated at 264', Fig. 18. As previously stated the bag 264 may have an upper sewed strip 265. When a bag is placed upon the left hand filling spout 241, for example, the spout extends into the bag through the valve and the sleeve 264', the latter fitting snugly around said filling spout 241. After the bag is placed upon the filling spout in this manner, the clamp I is manually closed to firmly secure the upper bag surface to the filling spout. As is apparent from Fig. 18, the bottom portion of the bag is disposed within the U-shaped frame member 291 and the lowermost surface of the collapsed, empty bag is preferably a short distance above the bottom of said U-shaped frame member 291. While so supported, a vertical oscillatory or jigging motion is imparted to the bag chair J and to the bag by the settler mechanism K in the manner previously described. A weighed charge of material is then delivered from the adjacent filling hopper H through the filling spout 241. As the material enters the bag, the bag walls spread apart and the bag becomes shorter since the bottom portion of the bag moves upwardly in the aforesaid U-shaped frame member 291 until, when the bag is filled, the bottom of the bag rests upon the saddle portions 290 of the bag chair J. This movement of the bottom of the bag is aided by the described oscillatory or jigging motion imparted to the bag chair J.

After the bag has been filled, the lever 272 is moved in a counter-clockwise direction by cam action to release the clamp I which, incidentally, indicates to the operator that the bag has been filled. This movement of lever 272 also causes the locking member 350 to engage catch block 347 and stop the oscillatory motion imparted to the bag chair J by the settler mechanism K. At the same time, the bag pusher L engages the side of the bag and pushes the bag away from the machine, the bottom of the bag moving longitudinally of the saddle portions 290. When the side of the bag which is engaged by the pushing member L reaches the middle of the bag chair J, the bracket 325 at the left of the machine, Fig. 24, engages the screw 324, Fig. 1, to thereby release the bag chair J from its locked position and permit said bag chair J to tilt. Thereupon the bag slips off the filling spout 241 onto the left hand trap door 375, Fig. 24. The bag remains in this position for the operator to tuck in the sleeve or otherwise effect closure of the bag. After the closure of the bag has been completed, the right hand bracket 325, Fig. 24, moves forwardly to release the trap door in the manner hereinbefore described and allow the bag to drop down onto the chute 366.

After the bag has been discharged from the filling spout 241 in the manner described a new bag is placed upon the left hand filling spout 241 before the filled bag sleeve is tucked in, Fig. 2, and the clamp I is locked into position upon the bag thus moving the lever 272 in a clockwise direction, Fig. 1, to thereby return the bracket 325 and pushing member L to the respective positions shown in Fig. 1. This motion of lever 272 also releases the locking member 350 from engagement with the catch block 347 whereupon the settler mechanism K again operates to impart oscillatory motion to the bag chair J. If desired, the parts may be so positioned that the U-shaped frame portion 291 of the bag chair J is higher than shown in Fig. 18. In other words, the distance between the U-shaped portion 291 of the bag chair and the top of the filling spout 241 is less than the height of the bag. When the parts are so positioned, the bottom of the bag has a tendency to move rightwardly, Fig. 18, as the bag is being filled in response to the operation of the settler mechanism K. When the bag moves in this manner, less power is required to operate the pusher L and, in some cases, the bag will move a sufficient distance along the bag chair in response to the described oscillatory motion that the pusher L may be eliminated. In view of the foregoing description, it will be understood that the mechanism at the right hand side of the machine, Fig. 2, is operated in the same manner to perform the bag-filling operations previously described.

It will be apparent that the operation of the apparatus requires very little manual work by the operator. More particularly, the operator only has to take an empty bag and apply it to the proper filling spout and then close the bag clamp I thereon. The bag is then automatically filled and, while the bag is being filled, the oscillatory or jigging movement is applied to the bag chair J by the settler mechanism. After the bag has been filled the clamp automatically opens and the bag is automatically pushed off the filling spout and bag chair onto the adjacent trap door. The operator then tucks in the sleeve or otherwise effects closure of the bag whereupon the trap door mechanism automatically operates to drop the bag down onto the adjacent chute 366.

With respect to the power mechanism and control apparatus to be described next, it is to be understood that only one set of parts is provided and the parts are not duplicated at the right hand and left hand sides of the machine, Fig. 2.

The driving mechanism

The power may be supplied to the machine by a motor 400, Figs. 1 and 34, which is mounted in any suitable manner on the frame 40. The motor 400 has a shaft 401 on which there is a sheave 402 connected by a belt 403 to a sheave 404 which is mounted on a countershaft 405 journalled in the frame 40. The countershaft 405 has a pair of sheaves 406 at the left hand end thereof, either one of which may be connected by a belt 407 to one of the pulley surfaces on the hereinbefore described sheave 53 which drives the feeding mechanism A. It will be apparent that two different speeds of operation of the feeding mechanism A may be obtained by using either the inner set or outer set of pulley surfaces, Fig. 1. It will further be apparent that the sheave 53 rotates the agitator screws 42, 42 and the filling screw 52 whenever the clutch 54 is engaged. A pair of sheaves 408, 408' are mounted on the right hand end of shaft 405, sheaves 408, 408' being connected by belts 409 and 409', respectively, to the aforementioned sheaves 244 and 244', on the shafts which drive the left hand and right hand filling screws, respectively, Fig. 2.

The shaft 243, Fig. 1 is drivably connected to the shaft 342 by a belt 410 which passes over the sheave 245 and a pulley 411 mounted on the shaft 342. The sheave 343, Fig. 14, on shaft 342 is connected by a belt 412 to the sheave 247 on shaft 248. Accordingly, it will be apparent that the shaft 342, Fig. 1, of the settler mechanism and the agitator screw 249 are driven continuously from the filling screw shaft 243 during operation of the machine the shaft 243 being driven, in turn, by the main motor 400. A similar arrangement is provided for driving the settler mechanism and agitator screw from the filling screw shaft at the right hand side of the machine, Fig. 2, this driving mechanism comprising a belt 410' drivably connecting a pulley 411' on the right hand shaft 342 with the sheave 245' together with a belt 412' connecting the sheave 343' and the sheave 247'.

The control apparatus and safety device

The operation of the mechanism is timed by control apparatus which is indicated generally at N, Figs. 1 and 25, the apparatus being mounted within the housing 113. The control apparatus N is driven by a shaft 413 which is journaled in a housing 113' extending from and secured to housing 113. A worm wheel 414 is mounted on shaft 413, worm wheel 414 meshing with a worm 415, Figs. 25 and 27, which is mounted on a shaft 416 journaled in the housing 113'. A sheave 417, Figs. 27 and 34, is secured to the shaft 416 and an idler sheave 418 is mounted on a bracket secured to the housing 113'. A belt 419 drives the sheave 417 and passes over idler sheave 418, belt 419 being driven by a sheave 420, Figs. 1 and 34, on shaft 248 which, in turn, is driven by the main motor 400 in the manner previously described. It will be apparent from the foregoing description that the shaft 413, Fig. 25, rotates continuously during the operation of the machine.

A ratchet wheel 421, Figs. 25 and 28, is keyed to the shaft 413. A pawl 422 is engageable with ratchet wheel 421 and is pivoted at 423 on a member 424 secured to a collar 425. A spring 426, which is mounted on the member 424, presses against a projection 427 on pawl 422 and tends to urge the pawl 422 into engagement with the teeth of ratchet wheel 421. The collar 425 is carried by and keyed to a shaft 428 which is journaled in the housing 113 so as to be substantially in alignment with shaft 413. A shaft 429 is journaled in the housing 113 below shaft 428, Fig. 25. A sleeve 430 is loosely mounted on shaft 429, sleeve 430 having arms 431 and 432 extending radially therefrom. The arm 432 extends through a suitable aperture in the housing 113 and is urged to the position shown in Fig. 28 by a spring 433 which is mounted on a bracket 434 on housing 113. The arm 431 carries a finger 435 which is engageable with the projection 427 on pawl 422. When projection 427 engages finger 435, projection 427 is moved into contact with the member 424, as shown in Fig. 28, so that the pawl 422 is disengaged from the teeth of ratchet wheel 421. Accordingly, when projection 427 engages finger 435, the collar 425 and shaft 428 remain stationary and are not rotated by shaft 413. When arm 432 is momentarily moved downwardly, Fig. 28, as will be hereinafter described, finger 435 moves in a clockwise direction, Fig. 28, out of engagement with projection 427. Thereupon, spring 426 urges the pawl 422 into engagement with the teeth of ratchet wheel 421 whereupon collar 425 together with shaft 428 are connected to the rotating shaft 413. As the shaft 428 moves through one revolution, the arms 431 and 432 are returned to the respective positions shown in Fig. 28. Consequently, at the end of said revolution of shaft 428, the projection 427 engages finger 435 with the result that pawl 422 is raised out of engagement with ratchet wheel 421 and the rotation of shaft 428 ceases. Therefore, when arm 432 is momentarily depressed, the collar 425 and shaft 428 make one revolution and then stop.

The upper end of a link 440, Figs. 1, 6, 28 and 32, is pivoted at arm 432 at 441, Figs. 28 and 32, the lower end of link 440 being slotted as at 440' to receive a pin 442 which is mounted on a lever 443. One end of lever 443 is pivotally mounted on a bracket 444 on the housing 113 and the other end of lever 443 is provided with a roller 445 which is urged into engagement with a stud on the lower end of the dribble gate control link 108, Figs. 6 and 32, by a spring 446. One end of spring 446 is mounted on a bracket 447 secured to the housing 113 and the other end of the spring 446 is secured to the lever 443.

A fixture 448 is pivoted on the lever 443 as at 449. Fixture 448 carries a pair of rollers 450, 450, Figs. 31 and 33, which are disposed at opposite sides of the lever 443 on a pin 451. The rollers 450 are adapted to be engaged, respectively, by a pair of intercepting shoes 452, 452, each of which is pivoted on the bracket 444 as at 453 and each shoe 452 has an arm 454 extending therefrom. In view of the foregoing description relating to the duplicate mechanisms forming a part of the machine, it will be understood that there is one bag discharge control link 278 located at the side of the machine toward the left and another duplicate bag discharge control link 278' located at the side of the machine toward the right, Fig. 31. As indicated in Fig. 32, each of the links 278 has a pair of spaced collars 455 pinned or otherwise suitably secured thereto and, within the space defined by each set of collars 455, the forked end of one of the arms 454 is received. When a bag is disposed on both of the filling spouts 241, Fig. 2, and both of the clamps I are locked, the links 278 are in their lowermost positions, Fig. 1. Consequently, the intercepting shoes 452 are in the positions shown in Fig. 1, in which neither of the shoes is in position to engage the adjacent roller 450. When one of the filling spouts does not have a bag thereon, the corresponding link 278 is in its uppermost position, the corresponding shoe 452 being in position to engage the roller 450, as shown in Fig. 32.

A rod 460 is pivoted to the fixture 448 at 461 and the rod 460 extends through a suitable passage in a bracket 462 which is mounted upon the housing 113. A spring 463 engages a collar 464 on rod 460 and presses against the bracket 462. Rod 460 also carries a collar 465 which is normally urged into engagement with the bracket 462 by the spring 463. A stud 466 is mounted on the rod 460 at the end thereof adjacent the collar 465.

A member 467 is pivoted at 468 on a bracket 469 mounted on the frame 40. A finger 470 formed integrally with the member 467 may be engaged by a rod 471, Figs. 1 and 32, which extends through a suitable passage in a guide 472 fixed to the bracket 469. The rod 471 is pivoted to an arm 473 which is pivoted at 474 on a bracket mounted on the frame 40. An arm 475 is formed integrally with arm 473 and is pivoted to one end of a rod 476, the other end of which is provided with a button 477. The member 467 also has an integral finger 478 extending therefrom which may be engaged by the stud 466. A latch finger 479 is mounted on the member 467 in any suitable manner, latch finger 479 having a locking surface 480 which is urged into engagement with a roller 481 by a spring 482 mounted on the bracket 469 and attached to the finger 479. The roller 481 is mounted on an arm 483, Figs. 1 and 32, which is pivotally mounted on the bracket 469 as at 484. An arm 485 which is integral with arm 483 is pivoted to a link 486 which, in turn, is pivoted to a lever 487 pivotally mounted on a bracket 488 extending from the frame 40, Fig. 2. One end of a spring 489, Figs. 1 and 14, is mounted on a collar 490 on link 486, the other end of spring 489 abutting the bracket 488. It will be apparent that the spring 489 urges the arms 483 and 485 to move in a clockwise direction, Fig. 1. An arm 491, formed integrally with arms 483 and 485, is pivoted at 492 to the lower end of a link 493, the upper end of which is pivoted at 494 to the aforesaid lever 58 which operates the clutch 54 on the feeding mechanism A.

The described mechanism normally functions to depress lever 443, Fig. 32, and thereby initiate operation of the control apparatus N as soon as a weighed charge of material is delivered to the weighing receptacle. This operation may be summarized as follows: As material is fed into the weighing receptacle D, both the bulk gates and dribble gate are open. When a predetermined weight—less than the desired final weight—is reached, the bulk gates close and material continues to flow into the weighing receptacle from the dribble stream receptacle. When the final desired weight is reached, the dribble gate is closed in the manner previously described, the dribble gate control link 108, moving downwardly, Fig. 32. As stated, when bags are clamped on the respective filling spouts 241, neither of the intercepting shoes 452 is in position to engage the adjacent roller 450. Therefore, under the conditions stated, the lever 443 moves downwardly to the position shown in Fig. 1, in response to the downward motion of dribble gate control link 108. Responsive to this downward motion of lever 443, the link 440, Figs. 28 and 32, is depressed to thereby move finger 435 out of engagement with the projection 427 on pawl 422. Thereupon, collar 425 and shaft 428, Fig. 25, make one revolution and then stop in the manner hereinbefore described.

In the event that one of the filling spouts 241, Fig. 2, does not have a bag clamped thereto, the associated claim I will be in open position and the associated control link 278, Figs. 1 and 32, will be in its uppermost position, as shown in Fig. 32. Consequently, the intercepting shoe 452 secured to said associated control link 278 will be in position to be engaged by the adjacent roller 450. When one of the intercepting shoes 452 is so positioned, the downward motion of dribble gate control link 108 causes lever 443 to start to move downwardly, Fig. 32, fixture 448 moving downwardly with lever 443 until one of the rollers 450 engages the adjacent shoe 452. As lever 443 continues to move downwardly, said roller 450 is retained in engagement with said shoe 452 and, accordingly, fixture 448 moves in a counter-clockwise direction, Fig. 32, with respect to the pin 451. The downward motion of lever 443 is stopped when said lever 443 engages the pin 451, Figs. 32 and 33, the latter being held in fixed position when said roller 450 is in engagement with said shoe 452. The movement of lever 443 is stopped in this manner before lever 443 moves downwardly to the position shown in Fig. 1 and just as the pin 442 carried by said lever 443 reaches the bottom of the slot 440' in the link 440. Consequently, there is no downward movement of the link 440 and actuation of collar 425, Fig. 25, and shaft 428 does not occur.

The described counter-clockwise motion of fixture 448 causes rod 460 and stud 466 to move toward the left, Fig. 32, the stud 466 engaging finger 478 to thereby rotate member 467 to the full line position shown in Fig. 32. Thereupon, the roller 481 is disengaged from the surface 480 of latch finger 479 and the arms 483, 485 and 491 are moved in a clockwise direction, Fig. 1, by the spring 489 thus causing link 493 to move upwardly to disengage the clutch 54 on the feeding mechanism A whereupon the stream of material flowing to the filling hopper C is cut off.

When a bag is placed upon the above described empty filling spout after the clutch 54 has been disengaged in the described manner, and the clamp I is closed on the bag, the corresponding link 278, Fig. 32, moves downwardly, whereupon the associated intercepting shoe 452 moves out of engagement with the adjacent roller 450. The dribble gate control link 108 is then urged downwardly by the spring 111, Fig. 6, causing the lever 443 to move downwardly to the position shown in Fig. 1 to thereby lower link 440, Fig. 28, and initiate operation of the control apparatus. It is then necessary for the operator to move lever 487, to thereby move the arms 483, 485 and 491 in a counter-clockwise direction, Fig. 1, and reengage the clutch 54 before a stream of material can again be fed to the machine. Thereupon, the spring 482 urges latch finger 479 into engagement with roller 481 to restore the parts to the respective positions shown in Fig. 1. The safety device is provided to prevent plugging or overflow of the machine if the operator does not keep up with the set speed of the machine. Thus, the operator must have a new bag on the filling spout within the timed cycle or the clutch is disengaged whereupon lever 487, Fig. 2, must be moved by the operator to resume the packing operation. The button 477 is provided so that the operator can, by pressing this button, disengage the clutch 54 to thereby cut off the supply of material to the machine in case there is an abnormal function of the machine or any part thereof.

Referring again to Fig. 25, it will be seen that the shaft 428 carries a gear wheel 500 which meshes with a gear wheel 501 keyed to the shaft 429, gear wheel 501 having twice as many teeth as gear wheel 500. Accordingly, when shaft 428 makes one revolution and then stops in response to a momentary depression of arm 432, Fig. 28, shaft 429 makes one-half revolution and then stops.

A cam e, Figs. 25 and 26, may be mounted on shaft 428, cam e having a recessed portion 502 therein which may be engaged by a lever 503 pivoted on the housing 113 as at 504. A spring 505 mounted on the housing 113 urges lever 503 into engagement with the cam e. The lever 503 engages the recessed portion 502 just as the shaft 428 stops after making one revolution in a counter-clockwise direction, Fig. 26. Thus, it will be apparent that the cam e and lever 503 prevent backlash of the shaft 428.

The bulk gate control cam a, Figs. 10 and 25, is fixed on the collar 425 which, in turn, is keyed to shaft 428. The sleeves 142 and 156, Figs. 9 and 25, which are integral with the bulk gate and dribble gate control levers 140 and 155, respectively, Figs. 10 and 25, are loosely mounted on the shaft 429, the roller 143 carried by lever 140, normally being in engagement with the cam a. The dump gate cam b, Figs. 10 and 25, is keyed to the shaft 428 while the sleeve 199 which carries the dump gate roller 200 is loosely mounted on shaft 429.

The deflector plate cam c, Figs. 12 and 25, is keyed to the shaft 429 while the sleeve 231 carrying the deflector roller 232 is loosely mounted on shaft 428. The left hand bag clamp and discharge cam d, Figs. 25 and 29, is fixed on shaft 429, the associated sleeve 281 and roller 283 being rotatably mounted on shaft 428. A cam f, Figs. 25 and 28, having the same shape as cam d but offset 180 degrees with respect to said cam d, is keyed to the shaft 429. Loosely mounted on the shaft 413 is a sleeve 281' having an arm 282' extending therefrom on which there is a roller 283'. An arm 280' on sleeve 281' is pivoted at 279' to a link 278' which is disposed at the right hand side of the machine, as viewed in Fig. 2. However, link 278' is not shown in Fig. 2. The cam f, roller 283', sleeve 281' and link 278' perform the same functions, respectively, as the cam d, roller 283, sleeve 281 and link 278 except that the former set of parts operates the bag mechanism at the right hand side of the machine, Fig. 2, while the latter set of parts operates the bag mechanism at the left hand side of the machine, Fig. 2.

As previously stated, each time the final desired weight of material is introduced into the weighing receptacle D, the dribble gate 100, Fig. 6, is closed by scale action, the dribble gate control link 108 moving downwardly, Figs. 1 and 28, together with the lever 443. If a bag is secured to both of the filling spouts 241, Fig. 2, neither of the intercepting shoes 452, Fig. 31, is in position to stop the downward motion of lever 443, Fig. 28, before it has moved a sufficient distance to lower link 440 and thereby move finger 435 out of engagement with projection 427 to initiate operation of the control apparatus. Each time the control apparatus is operated in this manner, shaft 428 makes one revolution and shaft 429 makes one-half revolution to thereby cause the following sequence of operations:

1. The lobe of cam b engages roller 200, Figs. 10 and 25, to thereby release the dump gates 178, 179, Fig. 2, allowing the weighed charge of material to drop from the weighing receptacle D, through the passage 215. With the deflector plate 226 in the position shown, the material is delivered into the left hand filling hopper H, Fig. 2. As soon as the material is discharged from the weighing receptacle D, the lobe of cam b, Fig. 10, passes out of engagement with roller 200 and the dump gates are swung back to their closed positions in the manner hereinbefore described.

2. The lobe of cam a, Figs. 10 and 25, engages the roller 143 to thereby move the control links 86 and 108 upwardly with the result that the bulk gates 75, 76, Fig. 2, and the dribble gate 100, Fig. 4, are opened, thus allowing the material to flow again to the weighing receptacle D. This upward motion of dribble gate control link 108 permits the lever 443, Fig. 28, to be urged upwardly by the spring 446 whereby finger 435 is returned to the position shown in Fig. 28. As the bulk gates and dribble gates open, finger 174, Fig. 10, is moved into engagement with the stop 175 responsive to the momentary engagement of the lobe of cam b with the roller 173 to thereby momentarily anchor the scale beam as the reserve supply of material falls into the weighing receptacle D from the bulk stream receptacles and dribble stream receptacle.

3. Cam c, Figs. 12 and 25, moves through an angle of 180 degrees. Assuming that the cam c and deflector plate 226 are initially in the positions shown in Figs. 12 and 11, respectively, movement of the cam c through an angle of 180 degrees causes the lobe of cam c to engage roller 232 to thereby move deflector plate 226 into engagement with the left hand stop member 227. Accordingly, the next charge of material will be delivered to the right hand filling hopper H. After the last-mentioned charge of material is delivered to the right hand filling hopper H, the cam c is again moved through an angle of 180 degrees to the position shown in Fig. 12. Thereupon, the deflector plate 226, Fig. 11, is urged into engagement with the right hand stop member 227 by the spring 233, Fig. 12, and the cam c together with roller 232 are returned to the respective positions shown in Fig. 12.

4. The cams d and f, Figs. 25, 28 and 29, are each moved through an angle of 180 degrees. With the parts in the position shown, the lobe of cam f engages roller 283' to thereby raise the link 278' at the right hand side of the machine, Fig. 2, thus causing the clamp I, the pushing member L, the bag chair J and the settler mechanism K on the right hand side of the machine to operate in the manner hereinbefore described. The elevation of right hand link 278' also causes the left hand trap door, Fig. 22, to be momentarily released. The link 278' remains in said raised position until the right hand clamp I, Fig. 2, is closed upon a new bag. As the cam d moves through an angle of 180 degrees, the roller 283 remains in the position shown. When a bag is clamped upon the left hand filling spout 241, Fig. 2, the link 278 is moved downwardly and roller 283 moves into engagement with the circular part of cam d. The next time the control apparatus is actuated, cams d and f again move through an angle of 180 degrees, the lobe of cam d engaging roller 283 to operate the clamp I, the pushing member L, the bag chair J and the settler mechanism K on the left hand side of the mechanism, Fig. 2, in the manner previously described. This motion of link 278 also momentarily releases the right hand trap door 375, Fig. 22. During this second movement of the cams d and f, the roller 283' is spaced from the circular part of the cam f until a new bag is clamped upon the right hand filling spout 241, Fig. 2. Thereupon, the link 278' is lowered and the roller 283' moves into engagement with the circular part of the cam f.

5. The projection 427, Fig. 28, engages finger 435 to thereby stop the revolution of shafts 428 and 429, Fig. 25, until the control apparatus is again actuated by depressing the link 440, Fig. 28.

The entire operation may be briefly summarized as follows: It will be assumed that a filled bag (L. H. bag 1) has just been discharged from the left hand bag chair J, Fig. 24, onto the left hand trap door 375 and that a filled bag (R. H. bag 1) is secured to the right hand filling spout 241. It is also assumed that the motor 400, Fig. 1, is operating and that the clutch 54 is engaged so that feed screw 52 and agitator screws 42, 42 of the feeding apparatus A are rotating as are the filling screw 242, agitator 249 and settler shaft 342 at both sides of the machine. At this time, the deflector gate 226 is in the position shown in Fig. 2, the dump gates 178, 179 are closed and the bulk gates 75, 76 together with dribble gate 100 are open. The right hand bag chair J, Fig. 2, is being oscillated by the right hand settler mechanism K while the left hand settler mechanism K is locked. It will further be assumed that a stream of material is being delivered to the hopper 41 from a storage bin, mill stream or other source of supply.

Under the conditions stated, the weighing cycle is initiated, the material passing through the screw conveyor 52, Fig. 1, and filling spout B into the feeding hopper C. From the feeding hopper C both the relatively large bulk stream and relatively small dribble stream flow into the weighing receptacle D in the manner hereinbefore described. When a predetermined weight of material—less than the final desired weight—is introduced into the weighing receptacle D, the scale E moves whereupon bulk gate trip screw 148, Fig. 10, engages finger 147 to thereby effect closure of the bulk gates 75, 76 and cut off the bulk stream. The dribble stream continues to flow into the weighing receptacle D until the final desired weight of material is introduced into the weighing receptacle whereupon dribble gate trip screw 163 engages finger 162 to thereby effect closure of the dribble gate 100, Fig. 4, and cut off the dribble stream. The term "weighing cycle" in the appended claims is descriptive of the operation set forth in this paragraph. Broadly speaking, however, the term "weighing cycle" may include any suitable method or means for weighing out a charge of material.

While this weighing cycle is in progress, the operator places a collapsed empty bag (L. H. bag 2) upon the left hand filling spout, Fig. 2, and engages the adjacent clamp I with the result that the settler apparatus L on the left hand side of the machine, Fig. 2, begins to operate and the left hand bag discharge control link 278, Fig. 29, is lowered to thereby move roller 283 into engagement with the circular part of the cam d. The operator then closes the bag (L. H. bag 1) which is supported upon the left hand trap door, Fig. 24. Preferably, the closure of the bag is effected by tucking in the sleeve thereon but the term "closure of the bab" or equivalent is intended to broadly cover any suitable method of accomplishing this result. In connection with the foregoing, it will be understood that with some types of bags, an independent closing operation is not necessary, particularly in cases where no sleeve is provided on the bag. The invention is, of course, applicable to filling bags of this type.

At the close of the weighing cycle, dribble gate control link 108, Fig. 28, moves downwardly to thereby momentarily depress arm 432 and initiate operation of the control apparatus N. Responsive to this actuation of the control apparatus, the dump gates 178, 179 swing open, allowing the weighed charge of material to drop from the weighing receptacle D whence it is directed into the left hand filling hopper H, Fig. 2, by the deflector plate 226. Thereupon, the left hand filling screw 242 feeds the material through the left hand filling spout 241, Fig. 2, into the bag (L. H. bag 2) supported thereby.

As soon as the weighed charge of material is dumped from the receptacle D, the dump gates 178, 179 are closed in the manner hereinbefore described and the bulk gates 75, 76 together with dribble gate 100 are opened. Thereupon, the reserve supply of material, which has accumulated in the filling hopper C while the bulk gates and dribble gate were closed, falls into the weighing receptacle D and the weighing cycle starts again. As said reserve supply drops into the weighing receptacle D, the scale E is momentarily anchored by engagement of the finger 174, Fig. 10, with stop 175.

The aforesaid actuation of the control apparatus N also causes the deflector plate 226 to move in a counter-clockwise direction, Fig. 2, into engagement with the left hand stop member 227. Furthermore, the lobe of cam *f*, Fig. 28, engages roller 283' causing the link 278' to be elevated with the result that the lever 272, Fig. 1, at the right hand side of the machine, Fig. 2, is moved in a counter-clockwise direction, Fig. 1. Responsive to this motion of said lever 272, the right hand clamp I, Fig. 2, is released and the right hand settler mechanism K is locked. Thereupon, the right hand pushing member L pushes the adjacent bag (R. H. bag 1) across the bag chair J, the latter tilting and allowing said bag to slide onto the right hand trap door mechanism M, Fig. 24. At the same time, the left hand trap door mechanism M, Fig. 24, is released allowing the bag (L. H. bag 1) supported thereby to fall through the trap door onto the adjacent chute 366.

At this time, the operator places a bag (R. H. bag 2) upon the right hand filling spout 241 and secures the adjacent clamp I thereto whereupon the right hand settler mechanism L starts to operate. Then, the operator closes the bag (R. H. bag 1) on the right hand trap door mechanism, Fig. 24. While these last described operations are being performed, the bulk gates 75, 76 together with dribble gate 100 are open and the weighing cycle is in progress. At the close of said weighing cycle, the control apparatus N operates again. Thereupon, the weighed charge of material is dropped from the weighing receptacle D and directed into the right hand filling hopper H, Fig. 2, by the deflector plate 226 whence the material passes through the adjacent filling spout 241 into the bag (R. H. bag 2) supported thereby. After the weighed charge of material passes therethrough, the deflector plate 226 returns to the position shown in Fig. 2. Thereupon, the dump gates 178, 179 close and the bulk gates 75, 76 together with the dribble gate 100 open in the described manner to initiate another weighing cycle.

The last-mentioned actuation of the control apparatus N also operates the bag release mechanism at the left hand side of the machine, Fig. 2, thus causing release of the left hand clamp I and stopping the left hand settler mechanism K. The left hand pushing member L then pushes the adjacent bag (L. H. bag 2) across the left hand bag chair J, the latter tilting to allow said bag (L. H. bag 2) to slide onto the left hand trap door mechanism, Fig. 24. At the same time, the trap door mechanism at the right hand side of the machine, Fig. 24, is momentarily released to allow the bag (R. H. bag 1) supported thereon to fall through the trap door onto the adjacent chute 366, Fig. 22.

It will be apparent that we have described a complete cycle of operations since the parts are now in the original position with a filled bag upon the right hand filling spout 241, Fig. 2, and a filled bag upon the left hand trap door mechanism, Fig. 24. It will be apparent that both bag discharge mechanisms including the bag pushers, clamps and trap door mechanisms are all operated by the links 278 and 278' which, in turn, are moved by the control apparatus. It is within the scope of the invention to utilize a separate power source for the bag discharge apparatus, the bag discharge cams *d* and *f* being used to actuate this separate power source.

In the event that the operator fails to place a bag upon the proper filling spout before the weighing cycle is completed, the downward motion of dribble gate control link 108, Fig. 1, does not cause operation of the control apparatus but, instead, one of the intercepting shoes 452 is moved into position to engage the adjacent roller 450 to thereby disengage the clutch 54, Fig. 1, on the feeding mechanism A and cut off the supply of material to the filling hopper C. When a bag is then secured to said filling spout, and the adjacent clamp I is closed thereon, the shoe 452 moves out of engagement with the roller 450 whereupon the control apparatus N is actuated and the weighed charge of material is delivered into the bag. However, in order to restore the flow of material to the filling hopper C, it is then necessary for the operator to move lever 487 to thereby manually re-engage the clutch 54. The operator can, at any time, stop the flow of material to the machine by pressing the emergency button 477 which directly disengages the clutch 54.

A modification of the invention is illustrated in Figs. 35 to 39, inclusive, in which the filling screws 242 and agitator screw 249 in the respective filling hoppers H are driven by individual start-stop motors instead of from the main motor 400. In this modification, parts which are similar to parts already described will be indicated by similar reference characters. The driving arrangement for the modified form of the invention is shown in Fig. 35, in which it will be seen that the main motor 400 drives the countershaft 405 and the sheave 53 of the feeding apparatus A in the manner previously described. The control apparatus N is driven from the countershaft 405 by a sheave 525 which is mounted at the right hand end of the countershaft 405, Fig. 36, sheave 525 being connected by a belt 526, Fig. 39, to a sheave 527 mounted on a shaft 528 which is suitably journaled in an extension 529 of the frame 40. A sheave 530 is mounted on the shaft 528 and connected by a belt 531 to the sheave 417 which drives the control apparatus N, the belt 531 also passing over the idler sheave 418.

The mechanism for driving the left hand filling screw 242 and settler K, Fig. 2, will be described next. It will be understood that this mechanism is duplicated on the right hand side of the machine, Fig. 2, and similar parts on the right hand side of the machine will be indicated by primed reference characters.

A stop-start motor 535, Fig. 36, is mounted, in any suitable manner, on the frame 40, the motor 535 having a shaft 536 which is connected, in any suitable manner, to the shaft 243 on which the filling screw 242 is mounted. A sheave 537 mounted on the shaft 243 is connected by a belt 538 to a pulley 539 which is mounted on the shaft 342 which drives the settler mechanism K. A sheave 540 is also mounted on the shaft 342, sheave 540 being connected by a belt 541 to a sheave 542 on the shaft 248 which drives the agitator screw 249. Accordingly, it will be apparent that the motor 535 drives the settler mechanism K, the filling screw 242 and the agitator screw 249 by a direct drive.

The motor 535 is controlled by a switch 545, Fig. 36, which has a pivoted switch lever 546 extending therefrom on which is mounted a roller 547. The roller 547 may be engaged by a lever 548 which is pivoted on the frame 40 at 549, the lever 548 being operated in the same manner as the lever 272, shown in Fig. 1. When a bag is placed upon the filling spout 241 and the clamp I is closed thereon, the lever 548 is swung in a clockwise direction to thereby close the switch 545. Thereupon, operation of the motor 535 is initiated which, in turn, causes operation of the settler mechanism K, the filling screw 242 and agitator screw 249 associated therewith. When the bag-discharge control link 278 is raised by cam action to release the clamp I, the lever 548 is swung in a counter-clockwise direction, Fig. 36, the switch lever 546 being moved in a clockwise direction by a suitable spring, not shown. Accordingly, the switch 545 is opened to thereby stop the motor 535 with the result that the operation of the filling screw 242, the agitator screw 249, and the settler mechanism K is stopped.

In order that this mechanism may stop at once when the clamp I is released, a brake 550 is provided on the shaft 536. As is shown in Fig. 37, the brake 550 comprises a drum 551 which is suitably mounted on the shaft 536 and rotatable therewith. A pair of levers 552, 552 are mounted on opposite sides of the brake drum 551, the levers 552 being pivoted at 553, 553, respectively, upon a member 554 secured in any suitable manner to the frame 40. Each of the levers 552 carries a brake shoe 555 which is engageable with the brake drum 551. The left hand lever 552, Fig. 37, is pivoted at 556 to a link 557 which, in turn, is pivoted to a bell crank 558 as at 559. The right hand lever 552, Fig. 37, is pivoted to bell crank 558 as at 560. A rod 561 is pivoted to bell crank 558 as at 562, rod 561 being provided with a collar 563, Figs. 37 and 38. A sleeve 564 is loosely mounted on the rod 561 above the collar 563, sleeve 564 being attached in any suitable manner to the adjacent link 278. A nut 567 is mounted at the upper end of rod 561 and a spring 568 is mounted between the nut 567 and the sleeve 564.

When the clamp I, Fig. 36, is automatically opened after a bag has been filled, the link 278 moves upwardly, carrying the collar 564 therewith and compressing the spring 568. When the spring 568 is compressed in this manner, the rod 561 is urged upwardly to thereby urge the brake shoes 555 into engagement with the brake drum 551. When a bag is placed upon the filling spout 241 and the clamp I is closed thereon, the link 278 moves downwardly, thus releasing the tension on spring 568 and disengaging the brake shoes 555 from the brake drum 551.

Accordingly, it will be apparent that the filling screw 242 and the agitator screw 249 together with the settler mechanism K are operated only when a bag is secured in position upon the filling spout 241 by the clamp I. After the bag is filled and the clamp I is released, the filling screw 242 and agitator 249 together with the settler mechanism stop very quickly due to the braking torque exerted on the shaft 536 by the brake 550. This arrangement aids in securing a dust-free operation of the filling spout by preventing operation of the filling screw when a bag is not clamped to the filling spout. Moreover, some of the vibrations set up when the settler mechanism is operated continuously are eliminated. In addition, the filling screws are stationary when a bag is not upon the filling spout and, consequently, there is no danger of the operator injuring a finger when placing a bag upon the filling spout. It will be understood that the lever 548 may be extended downwardly in order to automatically operate the bag chair J, Fig. 1, the bag pusher L and the trap door mechanism M in the same manner as the lever 272, Fig. 1.

A further modification of the invention is illustrated in Figs. 40 and 41 in which parts similar to those already described are indicated by like reference characters. An advantage of this modified construction is that an empty bag may be very easily and quickly taken from a bag holder and placed upon a filling spout. As shown, the bag holder for the right-hand filling spout is indicated at 575 as comprising a base 576 and a frame structure 577 for holding the empty bags. The frame structure 577 is provided with an opening 578 through which an empty bag may be slid out of the holder. The adjacent trap door is provided with a frame structure 579 which comprises a side rail 580 mounted on a corner post 581 and a side post 582 which are mounted on the frame 365 in any suitable manner. An end rail 583 extends from the corner post 581, rail 583 having a U-shaped end portion as at 584 which is mounted on a post 585 secured in any suitable manner to the frame 365. An opening 586 is defined between the U-shaped frame portion 584 and the adjacent guide rod 368, this opening being adjacent the opening 578 in the bag holder 575. A similar bag holder, not shown, is provided at the left hand side of the machine, Fig. 40. A supply of bags is placed in the bag holder 575 as at 587 with the valve end up and with the valve side adjacent the trap door. It will be apparent that an empty bag may be easily and conveniently slipped out through the openings 578, 586 past the filled bag resting on the trap door and placed upon the adjacent filling spout 241.

While the invention has been described with respect to a present preferred embodiment which has given satisfactory results, and certain modifications have been described, it will be understood by those skilled in the art, after understanding the invention, that various other changes and modifications may be made without departing from the spirit and scope of the invention and it is intended, therefore, in the appended claims to cover all such changes and modifications.

What is claimed as new and desired to be secured by Letters Patent is:

1. In bag-filling apparatus, a filling spout, a clamp movable from open position to closed position to secure a bag to said filling spout, weighing mechanism for periodically weighing charges of material, means for delivering material to said weighing mechanism, control means operatively interconnected to said weighing mechanism, operative in response to weighing movement thereof and normally operable to cause delivery of a weighed charge of material from said weighing mechanism to said filling spout, an interrupter device operable in response to movement of said clamp to the open position for interrupting the operative interconnection of said weighing mechanism and said control means for preventing operation of said control means when said clamp is in open position, and means controlled by said interrupter device to interrupt the delivery of material to said weighing mechanism when the clamp is open at the end of a weighing cycle.

2. In bag-filling apparatus, a bag-filling device, means for holding a bag in feed-receiving relation with respect to said bag-filling device, means for supplying a continuous stream of material to the bag-filling device, weighing mechanism for weighing successively a plurality of charges of material, the weighing of each charge comprising a weighing cycle, means operatively connected to said mechanism and normally operable at the end of a weighing cycle to deliver a weighed charge of material through the filling device into the bag, and a safety device operative in response to said bag holding means moving to an open position for preventing the delivery of a weighed charge of material through the filling device, said safety device being operable to cut off the supply of material to the machine when said bag holding device is in an open position at the end of a weighing cycle.

3. In bag-filling apparatus, the combination of a filling hopper, means defining a passage for delivering a charge of material to said hopper, and means defining a dust chamber disposed at a higher level than the hopper and communicating therewith, said chamber being adapted to receive the mixture of air and material displaced from the hopper when a charge of material is delivered thereto, the greater part of the material settling out in said chamber and falling back into the hopper, said chamber including a plurality of substantially parallel inclined baffles in spaced relationship defining vents therebetween, the latter communicating with said delivery passage to direct the air containing a residual amount of material from said chamber back into the filling hopper.

4. In bag-filling apparatus, a spout for filling a bag, a releasable trap door adapted to receive a filled bag from said filling spout and support said bag during closure thereof, a bag rack structure for holding a supply of empty bags, and supporting guide members for guiding a bag away from a filling relation with said spout and onto the trap door and for supporting said bag in desired position upon said trap door, said guide members and said structure being provided with aligned openings permitting the manual passing of an empty bag out of said bag rack structure through the openings and into filling relation with the filling spout, said supporting guide members being constructed and arranged to hold a bag on said trap door in a position removed from said aligned openings whereby an empty bag can pass therethrough while a filled bag is supported on the trap door.

5. In bag-filling apparatus, a pair of bag-filling devices, weighing cycle means operable to establish a series of successive weighing cycles to weigh charges of material for said bag-filling devices, said weighing cycle means including a scale which undergoes weighing movement, a pair of means for holding a pair of bags in feed-receiving relation with respect to each of said bag-filling devices, bag-discharge means associated with each bag-filling device for terminating said feed-receiving relation, a pair of releasable trap doors for respective of said bag-filling devices, each of said trap doors being located adjacent its respective bag filling device and positioned for receiving a filled bag when such is discharged therefrom by said bag discharge means, and control apparatus operatively connected to said weighing cycle means and actuatable at the end of each weighing cycle by such weighing movement, said control apparatus including flow control means for directing the weighed charges of material to one or the other of said bag filling devices, one actuation of said control apparatus actuating said flow control means for causing delivery of a weighed charge of material to one of the bags through the bag-filling device associated therewith to thereby fill the bag, means for operatively interconnecting said control apparatus and said trap doors, said last-named means being so constructed and arranged that said one actuation releases the trap door of the other bag filling device, mechanism for operatively interconnecting said control apparatus and said bag discharge means, the latter means associated with said last-mentioned bag filling device being actuatable by such mechanism whereby the filled bag is moved onto its respective trap door.

6. In bag-filling apparatus, a filling spout, a clamp for holding a bag on the filling spout, a tiltable bag chair, locking means for normally locking said chair in a substantially horizontal position to receive the bottom of the bag, said chair being tiltable about a preselected axis means for weighing a charge of material and delivering the weighed charge through the filling spout into the bag to thereby fill the bag, means operatively connected to said weighing means and effective after the bag has been filled to release the clamp and to engage and move the filled bag along the bag chair to substantially disengage the bag from the filling spout, such bag moving means being constructed and arranged for urging the bag along the chair in a straight-line motion to a predetermined extent relative to said axis wherein the center of gravity of the contents of the bag is outwardly disposed relative to such axis, and means for unlocking the bag chair after the bag has been substantially disengaged from the filling spout to allow the bag chair to tilt and discharge the filled bag.

7. In apparatus for weighing charges of material for a bag filling apparatus, a scale, a weighing receptacle carried by said scale, a hopper for feeding material to said weighing receptacle, means for continuously supplying material to said hopper, the latter having a gate movable to open position to effect delivery of material to said weighing receptacle, the gate being movable to a closed position to interrupt such delivery of material, a reserve supply of material being accumulated in said hopper when the gate is closed, mechanism for operatively interconnecting the gate and said scale for closing the gate in response to weighing movement of said scale, mechanism also operable in response to weighing movement of said scale for emptying said weighing receptacle after the closing of the hopper gate, means operable thereafter and in response to said scale weighing movement for momentarily locking said scale in a fixed position, and mechanism operable during said momentary locking of said scale for opening the hopper gate whereby a reserve supply of material is discharged into said weighing receptacle.

8. In a bag filling apparatus, a filling spout; a bag clamp movable from open position to closed position to secure a bag on said spout; weighing mechanism for weighing successively charges of material; material delivery means for feeding material to said weighing mechanism; control means operatively connected to said weighing mechanism and operable in response to weighing movement thereof, for delivering a weighed charge of material from said weighing mechanism; means for directing material delivered from said weighing mechanism to said spout; a control means interrupter operatively associated with said bag clamp and actuatable thereby in response to movement of said clamp to the open position, said interrupter being adapted for interrupting the operative connection between said weighing means and said control means whereby said weighing movement is prevented from affecting said control means; and mechanism operative in response to the actuation of said interrupter and operatively connected to said material delivery means for arresting operation of the latter means.

9. In a bag filling apparatus, means for weighing a charge of material; means including a filling spout operatively connected to said weighing means for delivering the charge of material to a bag in response to weighing movement of said weighing means; a bag clamp for holding a bag on the filling spout; a tiltable bag chair having means for normally locking same in an untilted position; bag chair jigging means operable during the filling of the bag; mechanism operable by said weighing mechanism a predetermined time after delivery of said charge to the bag for releasing said bag clamp, arresting the bag jigging means, and moving the bag along said bag chair to a point where the filling spout is at least partially withdrawn from the bag and the center of gravity of the bag and its contents is in tilting relation to said bag chair; and mechanism for releasing the bag chair locking means; said mechanism being operable after the bag has been so moved.

10. In apparatus for weighing a succession of full charges of material and filling same into bags, each of such charges being constituted by a large and a relatively small portion, the combination comprising: a scale; a weighing receptacle associated with said scale for receiving material; means for continuously supplying a relatively large stream of material from a source of supply, said stream falling toward said receptacle and comprising a bulk stream; a main intercepter hopper interposed in said bulk stream and having a gate movable to an open position to effect delivery of material in said hopper to said receptacle, including material which has accumulated in said hopper, said gate being closable in response to weighing movement of said receptacle resulting from receipt in said receptacle of such large portion of the full charge; means for supplying a relatively small stream of material, such stream comprising a dribble stream; a dribble stream intercepter hopper interposed in said dribble stream and also having a gate movable to an open position for emptying such hopper and permitting a flow therethrough of the dribble stream, the latter gate being closable in response to final weighing movement of said receptacle resulting from receipt in such receptacle of the large plus the small portions of the full charge; means responsive to final weighing movement of said receptacle for emptying same after the closing of said gates; a pair of bag filling units, each having a bag discharge device associated therewith; and control apparatus actuatable in response to such final weighing movement, one actuation thereof effecting delivery of a weighed charge of material to one of said bag filling units, the next actuation of said control apparatus actuating the bag discharge device of such bag filling unit.

11. In apparatus for weighing a succession of full charges of material and filling same into bags, each of such charges being constituted by a large and a relatively small portion, the combination comprising: a weigher having a receptacle associated therewith for receiving material; mechanism for continuously supplying a relatively large and a relatively small stream of material from a source of supply, said streams comprising respectively a bulk stream and a dribble stream; a main intercepter hopper interposed in said bulk stream and having a gate movable to an open position to effect delivery of material in said hopper to the receptacle, including material which is accumulated in said hopper, said gate being closable in response to a first weighing movement of the weigher; a dribble stream intercepter hopper interposed in said dribble stream and also having a gate movable to an open position for emptying such hopper and permitting a flow therethrough of the dribble stream, the latter gate being closable in response to further weighing movement of the weigher; dumping means for emptying the receptacle; a pair of bag filling devices, each having a bag discharge means associated therewith; and control apparatus actuatable in response to such further weighing movement, one actuation thereof operating said dumping means and effecting delivery of a weighed charge of material to the first of said bag filling devices, the next actuation of said control apparatus actuating the bag discharge means of said first bag filling device, operating said dumping means and effecting delivery of a weighed charge of material to the second of said bag filling devices.

12. In apparatus for weighing a succession of full charges of material and filling same into bags, each of such charges being constituted by a large and a relatively small portion, the combination comprising: weight responsive means having a weighing receptacle associated therewith for receiving material; means for supplying a continuous, large stream of material to said receptacle; means for supplying a continuous but relatively smaller stream of material to said receptacle; a main intercepter hopper having a dump gate and being interposed in the path of said large, continuous stream for intercepting same and accumulating a reserve charge of material therein; a subsidiary intercepter hopper having a dump gate and being interposed in the path of said smaller continuous stream for intercepting same and also accumulating a reserve supply of material therein, the inlet of said subsidiary hopper being positioned relative to said main intercepter hopper whereby a stream falling into said subsidiary hopper can fill same and overflow into said main hopper; a main gate control for closing the main hopper dump gate in response to a partial weighing movement of said weight responsive means resulting from a weight of material in the receptacle which comprises the large portion of the charge; a subsidiary dump gate control for closing the dump gate of the subsidiary hopper responsive to full weighing movement of said weight responsive means resulting from a weight of a full charge of material in the receptacle comprising the large plus small portions of the charge; means for emptying the receptacle in response to such full weighing movement after the closing of the dump gates; a pair of bag filling units; and control mechanism operative in response to full weighing movement of said scale for alternately directing weighed charges to each of said units.

13. In apparatus for weighing a succession of full charges of material, each of such charges being constituted by a large and a relatively small portion, the combination comprising: a weigher having a receptacle associated therewith for receiving material; mechanism for continuously supplying a large and a relatively small stream of material from a source of supply to the receptacle, said streams comprising respectively a bulk stream and a dribble stream; a main hopper interposed in the path of said bulk stream and having a gate which when closed permits the accumulation of a reserve supply of material in said hopper and when open effects delivery of such reserve supply and then permits a free flow of said bulk stream to said receptacle; a subsidiary intercepter hopper interposed in the path of said dribble stream and positioned for an overflow of material therefrom when full into said main hopper, said subsidiary hopper having a gate which effects delivery, when opened, of a supply of material accumulated therein and permits an unrestricted flow of said dribble stream after delivery of such reserve supply; means for closing said main hopper gate in response to weighing movement of said weigher caused by a first predetermined weight of material on said receptacle, said weight of material constituting such large portion of the full charge of material; and means for closing said subsidiary hopper gate in response to further weighing movement of said weigher as caused by a second predetermined weight of material on said receptacle, such second weight constituting the large portion of the full charge plus said relatively small portion of such charge; and means for emptying said receptacle in response to such further weighing movement.

NEILL E. DORRINGTON.
JOHN A. DYKER.
WILLIAM R. PETERSON.

REFERENCES CITED

The following references are of record in the file of this patent:

UNITED STATES PATENTS

| Number | Name | Date |
|---|---|---|
| 326,964 | Fisk | Sept. 29, 1885 |
| 757,777 | Sackett | Apr. 19, 1904 |
| 928,658 | Hoyt | July 20, 1909 |
| 931,054 | Gardner | Aug. 17, 1909 |
| 1,017,369 | Bates | Feb. 13, 1912 |
| 1,045,391 | Graf | Nov. 26, 1912 |
| 1,628,179 | Nelson | May 10, 1927 |
| 1,696,952 | Hartman | Jan. 1, 1929 |
| 1,733,905 | Randolph | Oct. 29, 1929 |
| 1,728,394 | Cornell et al. | Sept. 17, 1929 |
| 1,751,760 | Rees | Mar. 25, 1930 |
| 1,766,444 | Marsh | June 24, 1930 |
| 1,892,148 | Hohl | Dec. 27, 1932 |
| 1,926,802 | Currier | Sept. 12, 1933 |
| 2,004,593 | Andreas | June 11, 1935 |
| 2,051,565 | Marsh et al. | Aug. 18, 1936 |
| 2,034,972 | Carlson | Mar. 24, 1936 |
| 2,075,931 | Eades | Apr. 6, 1937 |
| 2,101,232 | Augustin | Dec. 7, 1937 |
| 2,137,334 | Dorrington | Nov. 22, 1938 |
| 2,193,709 | Bottger et al. | Mar. 12, 1940 |
| 2,207,885 | Howard | July 16, 1940 |
| 2,328,165 | Peterson | Aug. 31, 1943 |
| 2,340,883 | Kimball et al. | Feb. 8, 1944 |
| 2,345,287 | Peterson | Mar. 28, 1944 |
| 2,350,529 | Peterson | June 6, 1944 |
| 2,364,902 | Howard | Dec. 12, 1944 |

FOREIGN PATENTS

| Number | Country | Date |
|---|---|---|
| 434,853 | Great Britain | Sept. 10, 1935 |